(12) United States Patent
Feng et al.

(10) Patent No.: US 10,331,985 B2
(45) Date of Patent: Jun. 25, 2019

(54) METHOD AND SYSTEM FOR VERIFICATION OF PRINT MEDIA WITHIN A TRAY

(71) Applicant: Konica Minolta Laboratory U.S.A., Inc., San Mateo, CA (US)

(72) Inventors: Ann Qiongying Feng, San Jose, CA (US); Randy Cruz Soriano, San Leandro, CA (US); Kenneth Huang Young, San Mateo, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 0 days.

(21) Appl. No.: 15/858,624

(22) Filed: Dec. 29, 2017

(65) Prior Publication Data

US 2018/0189617 A1    Jul. 5, 2018

Related U.S. Application Data

(63) Continuation-in-part of application No. 15/252,913, filed on Aug. 31, 2016, now Pat. No. 10,075,622.

(51) Int. Cl.
*G06K 15/02*    (2006.01)
*G06K 15/00*    (2006.01)
*G06K 15/16*    (2006.01)
*H04N 1/60*    (2006.01)

(52) U.S. Cl.
CPC ......... *G06K 15/021* (2013.01); *G06K 15/027* (2013.01); *G06K 15/16* (2013.01); *G06K 15/1825* (2013.01); *G06K 15/1878* (2013.01); *G06K 15/4025* (2013.01); *H04N 1/603* (2013.01)

(58) Field of Classification Search
None
See application file for complete search history.

(56) References Cited

U.S. PATENT DOCUMENTS

| | | | | |
|---|---|---|---|---|
| 5,420,669 | A | * | 5/1995 | Imada ............... G03G 15/5095 399/16 |
| 2002/0124027 | A1 | | 9/2002 | Krueger et al. |
| 2004/0004731 | A1 | | 1/2004 | Itagaki |
| 2009/0251715 | A1 | * | 10/2009 | Kita ....................... G03G 15/01 358/1.9 |
| 2012/0120420 | A1 | * | 5/2012 | Miyazaki ............. H04N 1/6033 358/1.9 |
| 2013/0216244 | A1 | * | 8/2013 | Miyazaki ........... G03G 15/5062 399/15 |
| 2015/0201111 | A1 | | 7/2015 | Takasaki |
| 2016/0044195 | A1 | * | 2/2016 | Murrell ............. H04N 1/00724 358/1.1 |
| 2018/0139339 | A1 | * | 5/2018 | Xu ..................... H04N 1/00652 |

* cited by examiner

*Primary Examiner* — Thomas D Lee
(74) *Attorney, Agent, or Firm* — Buchanan Ingersoll & Rooney PC

(57) ABSTRACT

A method, system, and recording medium are disclosed for verifying a type of print media within trays of an image forming apparatus. The method includes feeding a sheet of a print media from a tray of the image forming apparatus to an in-line spectrophotometer; measuring characteristics of the print media with the in-line spectrophotometer, the measured characteristics of the print media including at least one of brightness, whiteness, or color; and determining if the measured characteristics of the print media matches a type of print media identified in a tray database for the tray of the image forming apparatus.

20 Claims, 24 Drawing Sheets

Tray Table

| | Size | Weight | Brightness | Whiteness | Color | Coating | Grain direction | Texture |
|---|---|---|---|---|---|---|---|---|
| Tray 1 | | | | | | | | |
| Tray 2 | | | | | | | | |
| Tray 3 | | | | | | | | |
| Tray 4 | | | | | | | | |

| Tray | Media Type | Size | Status | Event |
|---|---|---|---|---|
| 1 | Hammermill Great White 100 | Letter | Verified | |
| 2 | Hammermill Great White 100 | Legal | Verified | |
| 3 | Hammermill Premium Multipurpose | Letter | Unverified | Tray opened |
| 4 | Hammermill Great White 100 | Letter | Verified | |

| Media Type | Color Profile | Media Characteristic |
|---|---|---|
| Hammermill Great White 100 | HamGW100 | 60% White, 30% Blue, 10% Green |
| Hammermill Fore Multipurpose | HamFMP | 80% White, 10% Red, 10% Yellow |
| Hammermill Premium Multipurpose | HamPMP | 60% White, 40% Magenta |
| Hammermill Tidal MP | HamTMP | 20% White, 30% Blue, 50% Green |
| Domtar Copy | DomCPY | 60% White, 25% Cyan, 15% Green |
| Earthchoice30 Recycled Office Paper | DomERO | 45% White, 45% Blue, 10% Green |
| Century Premium Opaque | DomCPO | 60% White, 30% Blue, 10% Yellow |
| Cougar | DomCGR | 60% White, 30% Red, 10% Black |

FIG. 21

METHOD AND SYSTEM FOR VERIFICATION OF PRINT MEDIA WITHIN A TRAY

CROSS-REFERENCE TO RELATED PATENT APPLICATIONS

This application is a continuation-in-part of U.S. patent application Ser. No. 15/252,913, filed on Aug. 31, 2016, which is incorporated herein by reference in its entirety.

FIELD OF THE INVENTION

The present disclosure relates to a method and system for verification of a print media within a tray of image forming apparatus or printer, and more particularly to a method and system for ensuring that the print media in a tray has been verified by an in-line spectrophotometer (ILS) or colorimeter to contain the media characteristics associated with the print media and color profile.

BACKGROUND OF THE INVENTION

In order for a printing device to produce quality image prints, the printing device is calibrated to operate at an ideal level for producing consistent output by using the standard or generic color profile provided with the printing device which may work for various types of print media. Although the generic color profile output may be acceptable, it may not produce the best or highest quality image on each type of print media.

One problem can occur is that various print media types may produce image color shift due to the effect of the media properties such as the weight, brightness, whiteness, color, coating, direction of grains, texture, etc. For example, resulting image may appear reddish, yellowish, or more on blue on various print media because the generic color profile does not take into account the specific printing workflow and the printing device setup for the print media. This can be the case for example, if the user designates the paper tray and a color profile, which may not be suitable for the media in the paper tray.

In order to achieve the best quality print image for a designated print media, a correct color profile must be used or created corresponding to the designated media in the printing device. However, the process of assigning and selecting the correct color profile to a designated media can be guesswork. For example, the associated media properties (or attributes) must match the media properties defined for a color profile. For example, the color profile (i.e., "Flyer 1") may be specifically made for a specific printing device and for a specific print media and/or properties of the specific media. The properties or attributes of the print media can include, for example, weight, brightness, whiteness, color, and coating. If any of these variables change, a print image printed by a printer may not produce the best or optimal expected result.

Therefore, it would be desirable to have a system that analyzes the designated print media which best suits a color profile, and which uses the color profile to automatically determine the best suited or type of print media which can relatively easily deliver printed color results that are highly accurate and desired by the consumer.

In addition, in today's implementations, a color profile used in calibrating the image forming apparatus, printer, or multi-functional peripheral (MFP) can be developed or designed for a very specific paper media (or print media). The reason being that each paper media (or print media) may have a unique paper characteristic, for example the level of "whiteness" of the paper. Due to this unique paper characteristic, a color profile specific to the whiteness of the paper needs to be created.

However, the problem with today's implementation is that in many cases, the paper (or print media) on the tray is "NOT" the paper that was used to create the color profile. In addition, there may be no association between the paper on the tray with the paper used in creating the color profile.

It would be desirable to ensure that the paper or print media that is currently on the tray is the same paper that the printer or MFP is trying to associate with the color profile. For example, if the printer or MFP runs a calibration job with a set paper in Feeder Tray 1, if the user opens the Feeder Tray 1 and manually changes the paper to a different media type, known systems and methods cannot ensure that the correct or proper paper media or print media is housed within the feeder tray of the printer or MFP.

SUMMARY OF THE INVENTION

In consideration of the above issues, it would be desirable to have a system and method to produce the best color image on print media, and more particularly, producing a printing image wherein a color profile is created for the designated print media.

In addition, it would be desirable to have a system and method which conducts tray verification, wherein tray verification can be defined as the process of ensuring that the paper media in a tray has been verified by an in-line spectrophotometer (ILS) to actually contain the media characteristics associated with the media type name that is associated with the color profile name in the database.

In accordance with an exemplary embodiment, the verification process can consist of feeding one blank sheet from the tray, having the ILS read the paper media characteristics of the fed paper, searching for the media type name with reference to the media type database based on the measured characteristics. In addition, another exemplary method can include printing an image corresponding to a first ($1^{st}$) page, having the ILS read the paper media characteristics of the fed paper using margins of the paper, using the printed paper as output if a result matches the required media type, discarding the printed paper if a result does not match the required media type. In accordance with another exemplary embodiment, if there is an unverified tray, a job order can be changed so that a job which uses the unverified tray without conflict to its media type requirement (for example, a job which does not specified a color profile and media type), having the ILS read the paper media characteristics while printing the job.

A method is disclosed for producing a color image on a print media, the method comprising: receiving a selection of a color profile for a print job on a user interface, the color profile being associated with an attribute of a print media; determining if a tray on a printer stores a first print media corresponding to the selected color profile based on the attribute associated with the selected color profile; and when the tray on the printer stores the first print media corresponding to the selected color profile, performing a color conversion for the print job using the selected color profile, and printing the print job with the first print media corresponding to the selected color profile from the tray by a print engine on the printer.

An image forming apparatus is disclosed for producing a color print job, the image forming apparatus comprising:

receiving a print job, the print job being associated with a color profile, the color profile being associated with an attribute of a first print media; determining if a tray on the image forming apparatus stores the first print media corresponding to the color profile based on the attribute associated with the color profile; and when the tray on the image forming apparatus stores the first print media corresponding to the selected color profile, performing a color conversion for the print job using the color profile, and printing the print job with the first print media corresponding to the color profile from the tray by a print engine on the image forming apparatus.

A non-transitory computer readable recording medium stored with a computer readable program code for producing a color image on a print media is disclosed, the computer readable program code configured to execute a process comprising: receiving a selection of a color profile for a print job on a user interface, the color profile being associated with an attribute of a print media; determining if a tray on a printer stores a first print media corresponding to the selected color profile based on the attribute associated with the selected color profile; and when the tray on the printer stores the first print media corresponding to the selected color profile, instructing a printer to print the print job with the first print media corresponding to the selected color profile from the tray by a print engine on the printer.

A method is disclosed of verifying a type of print media within trays of an image forming apparatus, the method comprising: feeding a sheet of a print media from a tray of the image forming apparatus to an in-line spectrophotometer; measuring characteristics of the print media with the in-line spectrophotometer, the measured characteristics of the print media including at least one of brightness, whiteness, or color; and determining if the measured characteristics of the print media matches a type of print media identified in a tray database for the tray of the image forming apparatus.

A non-transitory computer readable recording medium stored with a computer readable program code is disclosed for verifying a type of print media within trays of an image forming apparatus, the computer readable program code configured to execute a process comprising: feeding a sheet of a print media from a tray of the image forming apparatus to an in-line spectrophotometer; measuring characteristics of the print media with the in-line spectrophotometer, the measured characteristics of the print media including at least one of brightness, whiteness, or color; and determining if the measured characteristics of the print media matches a type of print media identified in a tray database for the tray of the image forming apparatus.

An image forming apparatus is disclosed, comprising: an in-line spectrophotometer; at least one tray configured to hold a print media; and a processor configured to verifying a type of print media within the at least one tray of the image forming apparatus by executed a process comprising: feeding a sheet of a print media from the at least one tray of the image forming apparatus to the in-line spectrophotometer; measuring characteristics of the print media with the in-line spectrophotometer, the measured characteristics of the print media including at least one of brightness, whiteness, or color; and determining if the measured characteristics of the print media matches a type of print media identified in a tray database for the at least one tray of the image forming apparatus.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 11 is an illustration of a tray table for producing a color image on print media in accordance with an exemplary embodiment.

FIG. 20 is an illustration of a database having a plurality of print media in accordance with an exemplary embodiment.

FIG. 21 is an illustration of a plurality of print media with corresponding color profile and media characteristics in accordance with an exemplary embodiment.

DETAILED DESCRIPTION

Figure 1:
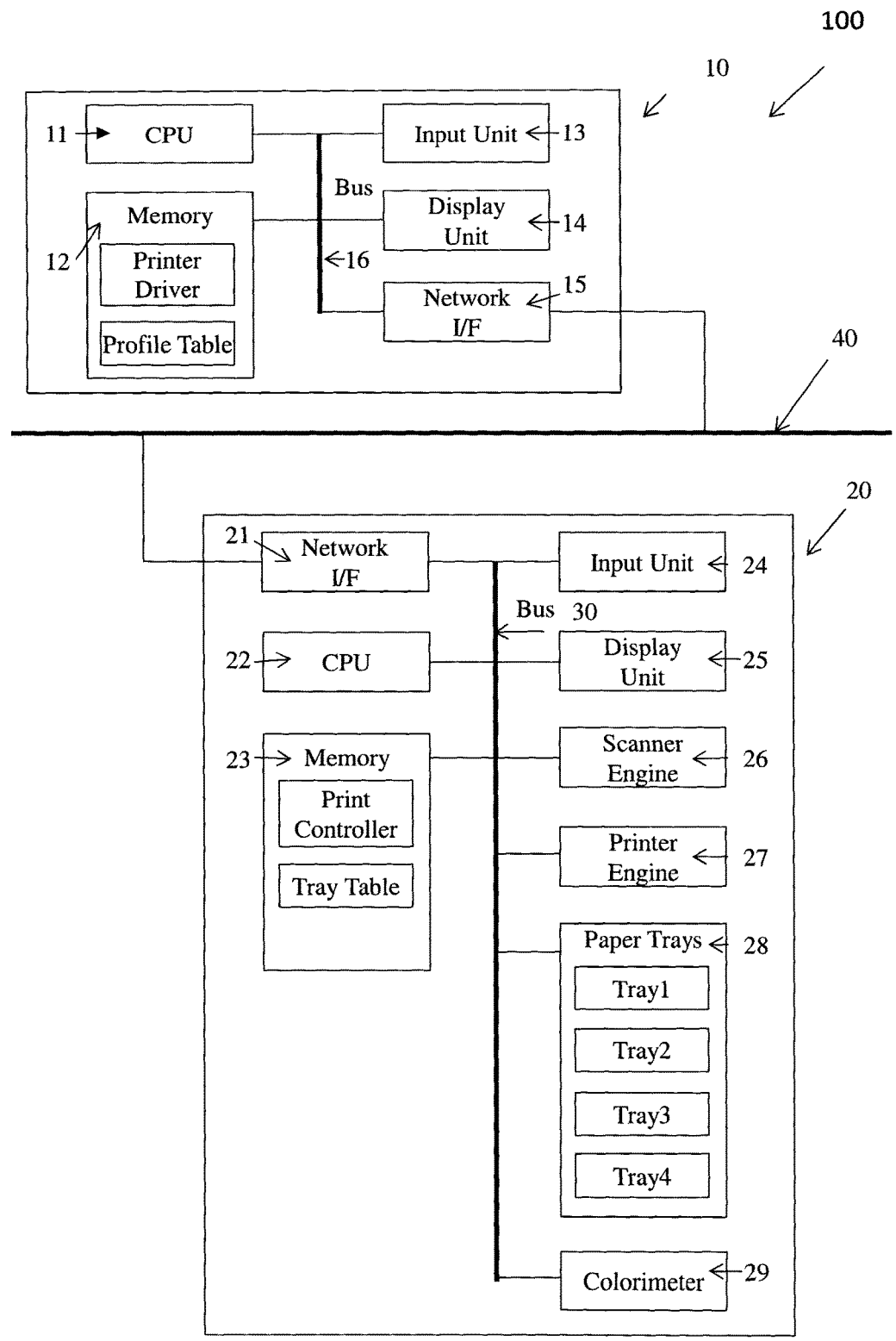
FIG. 1 is an illustration of an exemplary system to produce a color image on print media in accordance with an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

In accordance with an exemplary embodiment, a system and method are disclosed, which can produce a color image on print media, and more particularly, producing printed color images where a user selects a color profile and the system determines or matches the color profile to one or more print media, which can produce an optimal or best quality print image for the selected color profile.

In accordance with an exemplary embodiment, a user can designate on a printer driver user interface a color profile without designating a paper tray and paper type, and the system automatically determines a paper tray (with a specific paper type) based on the designated color profile. In addition, when a color profile is designated by the user for a print job, and the print media or paper corresponding to the designated color profile is not stored or available in the printer, the user can be alerted to this fact. In addition, if the print media is not available, the system and method as disclosed herein is configured in response to a user's instruction to print color patches and the printed patches can be measured by an inline color calibration unit (ICCU) on a paper path of the printer, or an offline colorimeter in order to make new color profile for the print media (or paper) stored in the printer.

In accordance with another exemplary embodiment, when the print media or paper corresponding to the designated color profile is not stored in the printer, the printer can determine whether or not a similar print media (or paper), for example, a print media having similar attributes or properties to the print media corresponding to the designated color profile is stored in the printer. If a similar print media or paper is stored in the printer, the printer can continue with the print job upon user approval using the similar print media or paper determined by the printer.

FIG. 1 is a diagram of an exemplary system 100 to produce a color image on print media in accordance with an exemplary embodiment. As shown in FIG. 1, the system 100 can include at least one host computer or client device 10 and at least one printer or image forming apparatus 20, which are connected, for example by a communication network (or network) 40.

Figure 10:
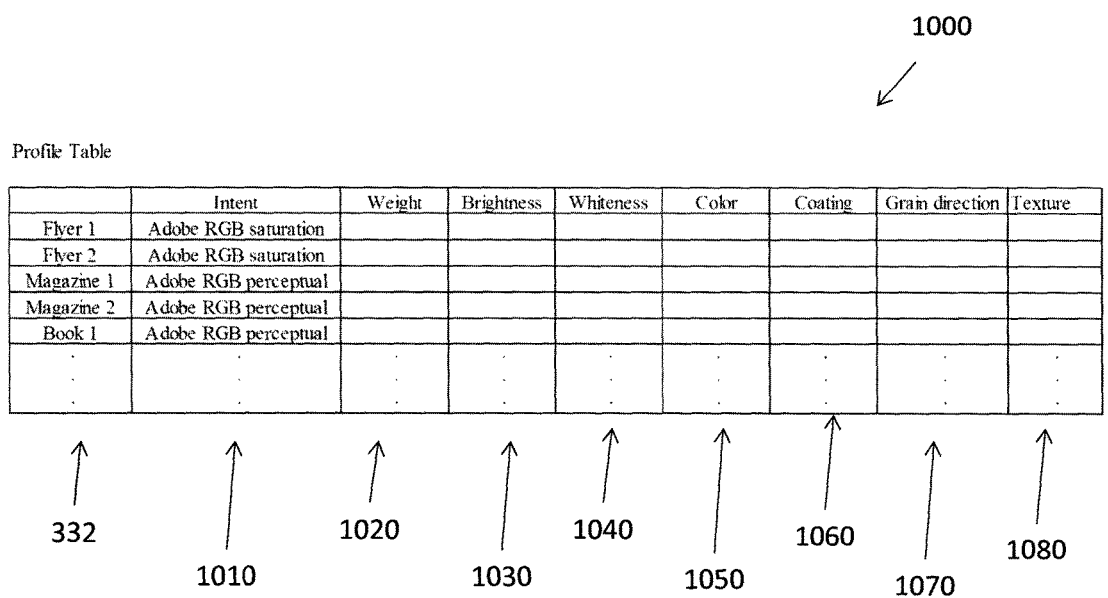
FIG. 10 is an illustration of a profile table for producing a color image on print media in accordance with an exemplary embodiment.

The exemplary host computer or client device 10 can include a processor or central processing unit (CPU) 11, and one or more memories 12 for storing software programs and data (such as files to be printed), a printer driver and a profile table (FIG. 10). The printer driver of the client device is preferably a software application that converts data to be printed into a form specific for the printer 20. The processor or CPU 11 carries out the instructions of a computer program, which operates and/or controls at least a portion of the functionality of the client device 10. The client device 10 can also include an input unit 13, a display unit or graphical user interface (GUI) 14, and a network interface (I/F) 15, which is connected to a communication network (or network) 40. A bus 16 can connect the various components 11, 12, 13, 14, 15 within the client device 10.

The client device 10 includes an operating system (OS), which manages the computer hardware and provides common services for efficient execution of various software programs. The software programs can include, for example, application software and printer driver software. For example, the printer driver software controls a multifunction printer or printer 20, for example connected with the client device 10 in which the printer driver software is installed via the communication network 40. In certain embodiments, the printer driver software can produce a print job and/or document based on an image and/or document data. In addition, the printer driver software can control transmission of the print job from the client device 10 to the printer or image forming apparatus 20.

The printer 20 can include a network interface (I/F) 21, which is connected to the communication network (or network) 40, a processor or central processing unit (CPU) 22, and one or more memories 23 for storing software programs and data (such as files to be printed). For example, the software programs can include a printer controller and a tray table. The processor or CPU carries out the instructions of a computer program, which operates and/or controls at least a portion of the functionality of the printer 20. The printer 20 can also include an input unit 24, a display unit or graphical user interface (GUI) 25, a scanner engine (or scanner) 26, a printer engine 27, at least one auto tray or paper tray 28, and more preferably a plurality of auto trays or paper trays, 28, for example, Tray 1, Tray 2, Tray 3, Tray 4 . . . Tray N, and a colorimeter 29. The auto tray or paper tray 28 can include a bin or tray, which holds a stack of a print media, for example, a paper or a paper-like product. In accordance with an exemplary embodiment, for example, the colorimeter 29 can be one or more color sensors or colorimeters, such as an RGB scanner, a spectral scanner with a photo detector or other such sensing device known in the art, which can be embedded in the printed paper path, and an optional finishing apparatus or device (not shown). A bus 30 can connect the various components 21, 22, 23, 24, 25, 26, 27, 28, 29 within the printer 20. The printer 20 also includes an operating system (OS), which manages the computer hardware and provides common services for efficient execution of various software programs.

In accordance with an exemplary embodiment, it can be within the scope of the disclosure for the printer 20 to be a copier. The printer engine or print engine 27 has access to a print media 200 (FIG. 2) of various sizes and workflow for a print job, which can be, for example, stored in the input tray. A "print job" or "document" can be a set of related sheets, usually one or more collated copy sets copied from a set of original print job sheets or electronic document page images, from a particular user, or otherwise related.

For example, in accordance with an exemplary embodiment, an image processing section within the printer 20 can carry out various image processing under the control of a print controller or CPU 21, and sends the processed print image data to the print engine 27. The image processing section can also include a scanner section (scanner 26) for optically reading a document, such as an image recognition system. The scanner section receives the image from the scanner 26 and converts the image into a digital image. The print engine 27 forms an image on a print media (or recording sheet) based on the image data sent from the image processing section. The central processing unit (CPU) (or processor) 22 and the memory 23 can include a program for RIP processing (Raster Image Processing), which is a process for converting print data included in a print job into Raster Image data to be used in the printer or print engine 27. The CPU 22 can include a printer controller configured to process the data and job information received from the one or more client devices 10, for example, received via the network connection unit and/or input/output section (I/O section) 24.

The CPU 22 can also include an operating system (OS), which acts as an intermediary between the software programs and hardware components within the multi-function peripheral. The operating system (OS) manages the computer hardware and provides common services for efficient execution of various software applications. In accordance with an exemplary embodiment, the printer controller can process the data and job information received from the one or more client devices 10 to generate a print image.

The network I/F 21 performs data transfer with the client device 10. The printer controller can be programmed to process data and control various other components of the multi-function peripheral to carry out the various methods described herein. In accordance with an exemplary embodiment, the operation of printer section commences when it receives a page description from the one or more client devices 10 via the network I/F 21 in the form of a print job data stream and/or fax data stream. The page description may be any kind of page description languages (PDLs), such as PostScript® (PS), Printer Control Language (PCL), Portable Document Format (PDF), and/or XML Paper Specification (XPS). Examples of printers 20 consistent with exemplary embodiments of the disclosure include, but are not limited to, a multi-function peripheral (MFP), a laser beam printer (LBP), an LED printer, a multi-function laser beam printer including copy function.

In accordance with an exemplary embodiment, the color calibration of the at least one printer 20 as shown in FIG. 1 can be performed by creating a color test pattern, for example, on the print controller of the CPU 22, which can be, for example, a Digital Front End (DFE) printer controller that can be set based on one or more print conditions, for example, after a specific number of print copies have been printed by the image forming apparatus or printer 20. With the calibration setting enabled, the color measurement pages can be printed, and the one or more printed color patches can be compared to a corresponding target color for each of the one or more printed color patches using the colorimeter 29. The color calibration patch compared to the target color (or target color data) can determine the color rendering performance of print engine of the image forming apparatus or printer 20 and/or generating a color profile as disclosed herein.

In accordance with an exemplary embodiment, the communication network or network 40 can be a public telecommunication line and/or a network (for example, LAN or WAN). Examples of the communication network 40 can include any telecommunication line and/or network consistent with embodiments of the disclosure including, but are not limited to, telecommunication or telephone lines, the Internet, an intranet, a local area network (LAN) as shown, a wide area network (WAN) and/or a wireless connection using radio frequency (RF) and/or infrared (IR) transmission.

Figure 2:
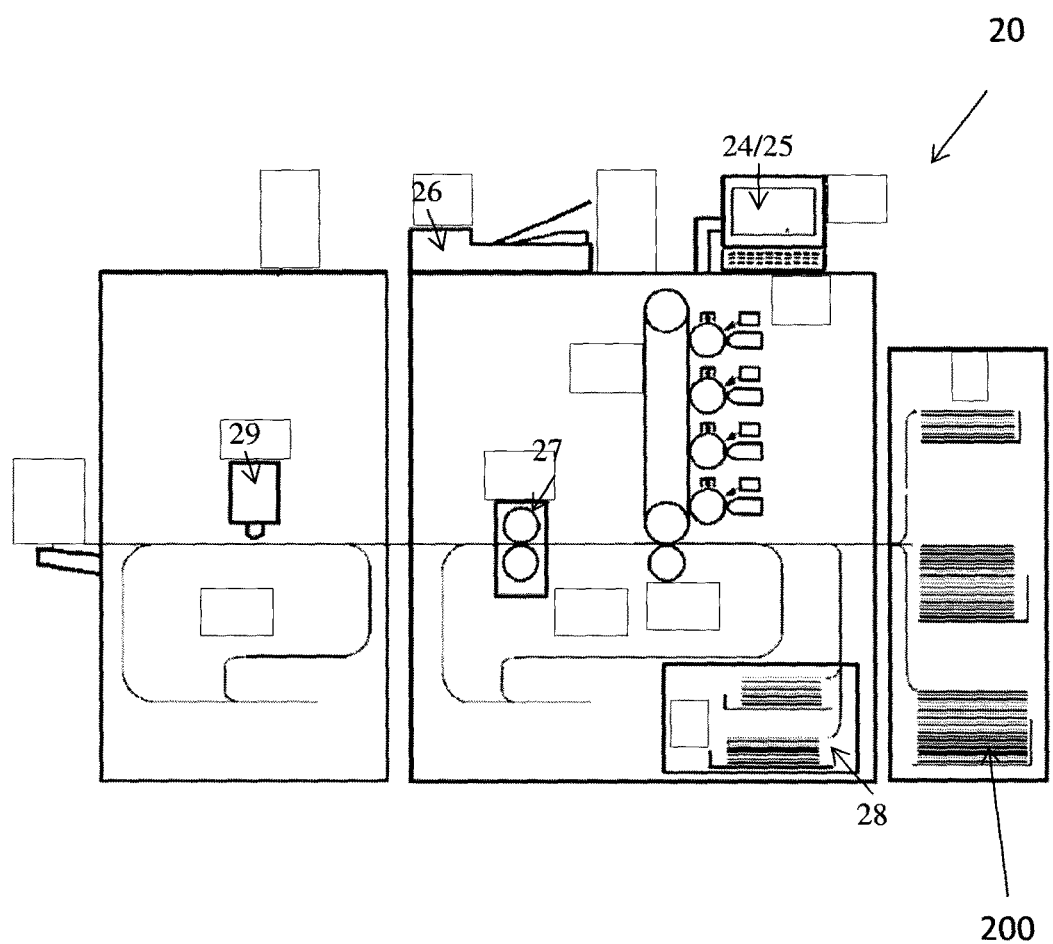
FIG. 2 is an illustration of image forming apparatus in accordance with an exemplary embodiment.

FIG. 2 is an illustration of a printer or image forming apparatus 20 in accordance with an exemplary embodiment. The printer or image forming apparatus 20 includes the input unit 24, the display unit or graphical user interface (GUI) 25, the scanner engine 26, the printer engine 27, the plurality of paper trays, 28, for example, Tray 1, Tray 2, Tray 3, Tray 4 . . . Tray N, and the colorimeter 29. As shown in FIG. 2, each of the plurality of paper trays 28 can be configured to hold a print media 200, for example, a stack of print media (or paper) 200.

In accordance with an exemplary embodiment, the print media 200 is preferably a paper or paper-like media having one or more print media attributes. The print media attributes can include, for example, paper color, coating, grain direction, printing technology, brightness, CIE, tint, whiteness, labColor, etc. In order to maximize print quality, the print media attributes of each type of print media should be input into or hosted on the printer 20, for example, on a printer configuration settings of the printer 20 to obtain the highest quality output. Most print media 200 is provided in reams or other known quantities, which are packaged with indicia such as information on the manufacture, size, type and other attributes of the print media. In addition, most bundles or reams of paper include a UPC (Universal Product Code) or bar code, which identifies the type of print media including manufacture of the print media.

In accordance with an exemplary embodiment, the attributes or properties of the print media can include paper size, weight, brightness, whiteness, color, coating, grain direction, texture, etc. (FIGS. 10 and 11). For example, weight determines the thickness of the paper. Whiteness is the reflectance of light with human visual perception. The most common whiteness measure, for example, is D65 illumination which represents outdoor daylight, which was developed based on the CIE standard and is called CIE Whiteness. However, different lighting effects can influence how the white paper appears. Brightness is the reflectance of blue light and is scale of 0 to 100, higher the number is brighter. Color represents the white shades of the paper, which commonly appear in paper label such as bright white, true white, etc. Paper coating, for example, gloss or dull, can effect or impact the appearance of the printed image.

In accordance with an exemplary embodiment, since the print media can influence the color output or the range of color reproduce during color imaging, it would be desirable to have a system and method as disclosed herein, which based on a color profile identifies an appropriate print media for the color profile, or a similar print media. The represented range of color is called the color gamut or color space. Such color space representation can include Adobe RGB, sRGB, etc. Often the color gamut on one device may appear different from another. For example, saturated blue color appearing on a display monitor may not be reproducible on the printing device because the printing device cannot make the color. In order to produce the visual representation for colors that are out of range, the rendering intent method can be used in creating the color profile. In accordance with an exemplary embodiment, a rendering intent can be selected depending on a different color reproduction policy. Types of the rendering intent can include, for example, perceptual, colorimetric and saturation, where a LUT (look up table) is provided for each type. For example, color profile "Flyer 1" (FIG. 11) has the rendering intent of 'Adobe RGB saturation' which goal is to preserve saturation over color, for example, if there is a dark blue that is out of range the color may be shift to more green to achieve closer saturation.

In accordance with an exemplary embodiment, the client device (or host computer) 10 can be configured to store a plurality of color profiles 330 and information corresponding to each of the color profiles 330. The client device 10 can include a module or processor (or CPU 11) that can generate new color profile for the printer 20 and the print media 200. The printer 10 has a plurality of trays (or paper trays) 28, which carries or holds the print media. The printer 20 can be equipped with the scanner (or scanner engine) 26 for scanning information sheets on packages of print media 200, or other suitable devices (not shown), which can acquire the printing media information that is stored in the paper trays 28. As disclosed herein, the printer 20 can be equipped with inline colorimeter (ICCU) 29 or an offline colorimeter (not shown) which measures printed color patches in order to generate color profiles. In accordance with an exemplary embodiment, the inline colorimeter (ICCU) 29 can be capable of detecting and acquiring the information of the print media 200 in the plurality of paper trays 28.

Figure 12:
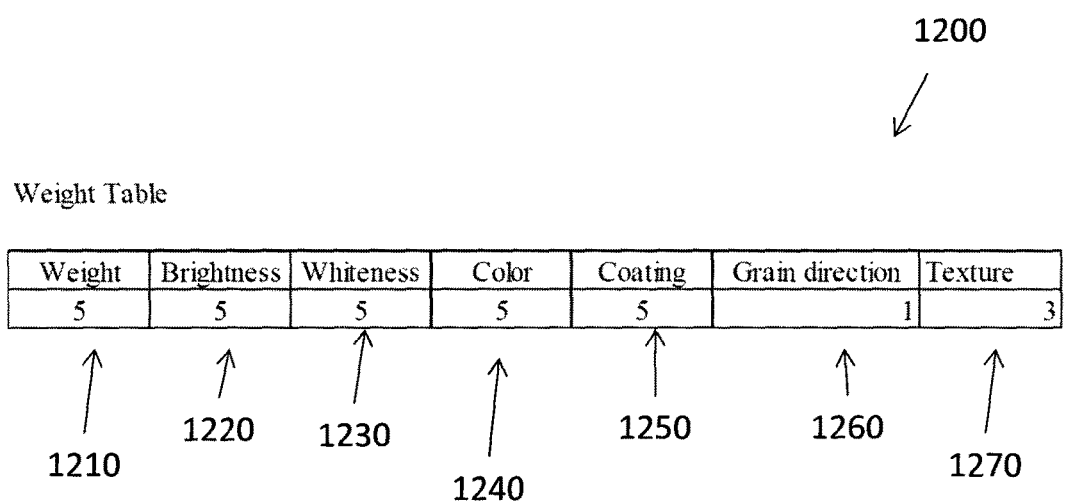
FIG. 12 is an illustration of a weighted attribute table for producing a color image on print media in accordance with an exemplary embodiment.

In accordance with an exemplary embodiment, the printer driver stored in the memory 12 of the client device 10 is configured to automatically determine a paper tray 28 from the plurality of paper trays 28 on the printer 20, which has the corresponding paper type (or print media) based on the designated color profile (S605). Each of the print media 200 within the paper tray 28 has attributes or properties such as the weight, brightness, whiteness, color, coating, grain direction, texture, etc. (FIG. 11), which have been input into the printer 20. In accordance with an exemplary embodiment, the best or optimal print media for a color profile 330 can be based on a selection process, in which the corresponding properties of the printing media 200 is based on the weighted values assigned to each attribute and property of the print media 200 (FIG. 12). For example, assigning each of the attributes or properties, a value between 0 and 5, where the most important properties which mostly affect the color output are designated with the highest value, for example, 5. In accordance with an exemplary embodiment, for example, the most important paper properties can include weight, brightness, whiteness, color, coating (glossiness), which can have a designation scale value equal to, for example, 5, and the other paper properties such as grain direction or texture can have designation scale value equal to, for example, 3 or less depending on the importance. In accordance with an exemplary embodiment, each of these attributes or properties of the print media 200 correspond to the designated color profile and information associated with the print media (or paper) 200, which have been stored in the host computer 10 and/or printer 20, which can help achieve the expected color output.

Figure 6:
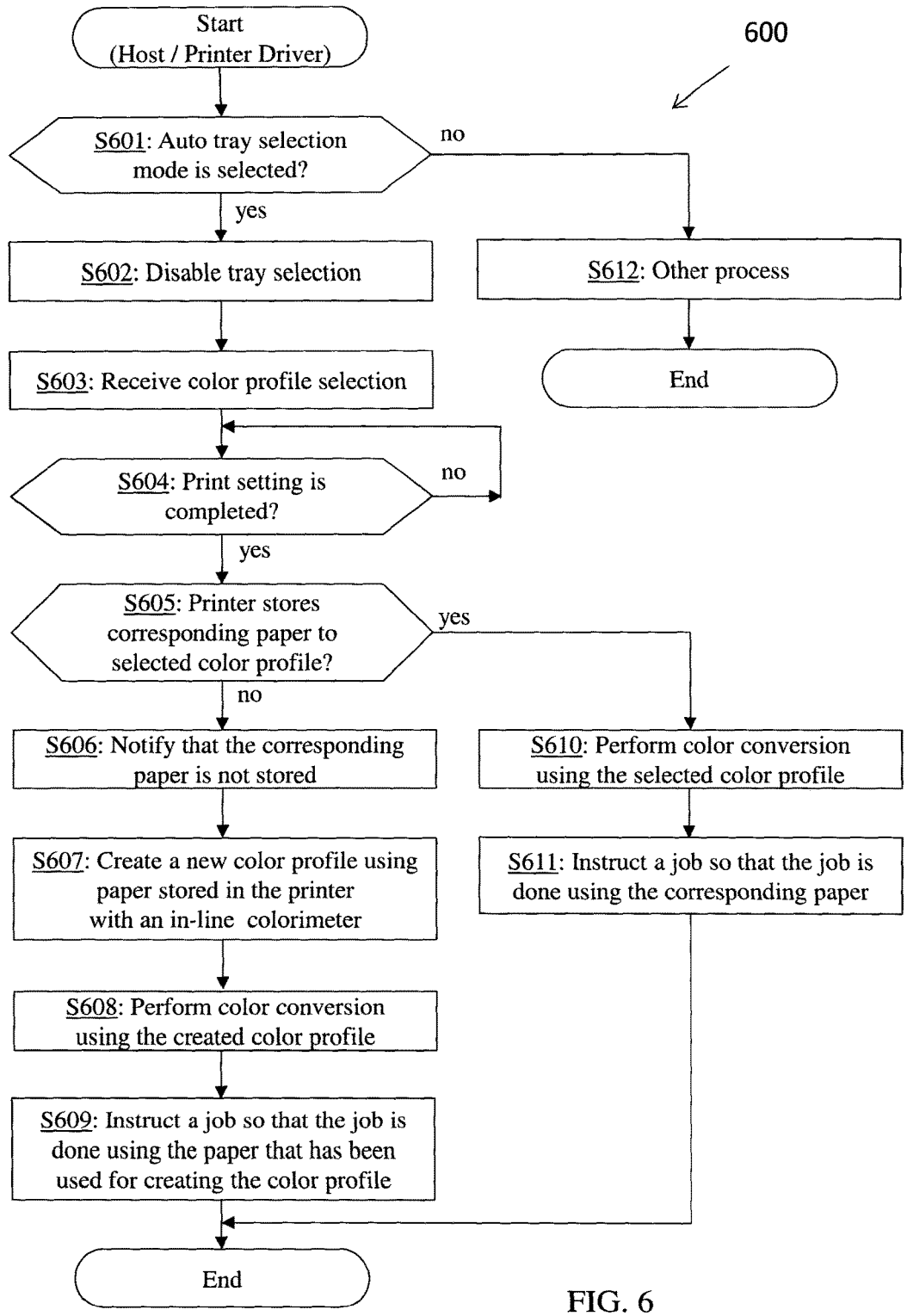
FIG. 6 is a flow chart illustrating a process for producing a color image on print media in accordance with a first exemplary embodiment.

In accordance with an exemplary embodiment, if the print media (or paper) 200 corresponding to the designated color profile 330 is not stored in the printer 20 ("No" at S605), the fact is alerted to the user (S606, FIG. 6). In response to a user's instruction or input, (for example, the user pushes "OK" in FIG. 4), an paper tray 28 can be selected having a print media or paper 200 to be used for calibration, and wherein color patches can be printed and the printed patches can be measured by an inline color calibration unit (ICCU) 29, or an offline colorimeter (not shown) in order to make new color profile corresponding to the print media or paper stored in the printer (S607).

Figure 8:
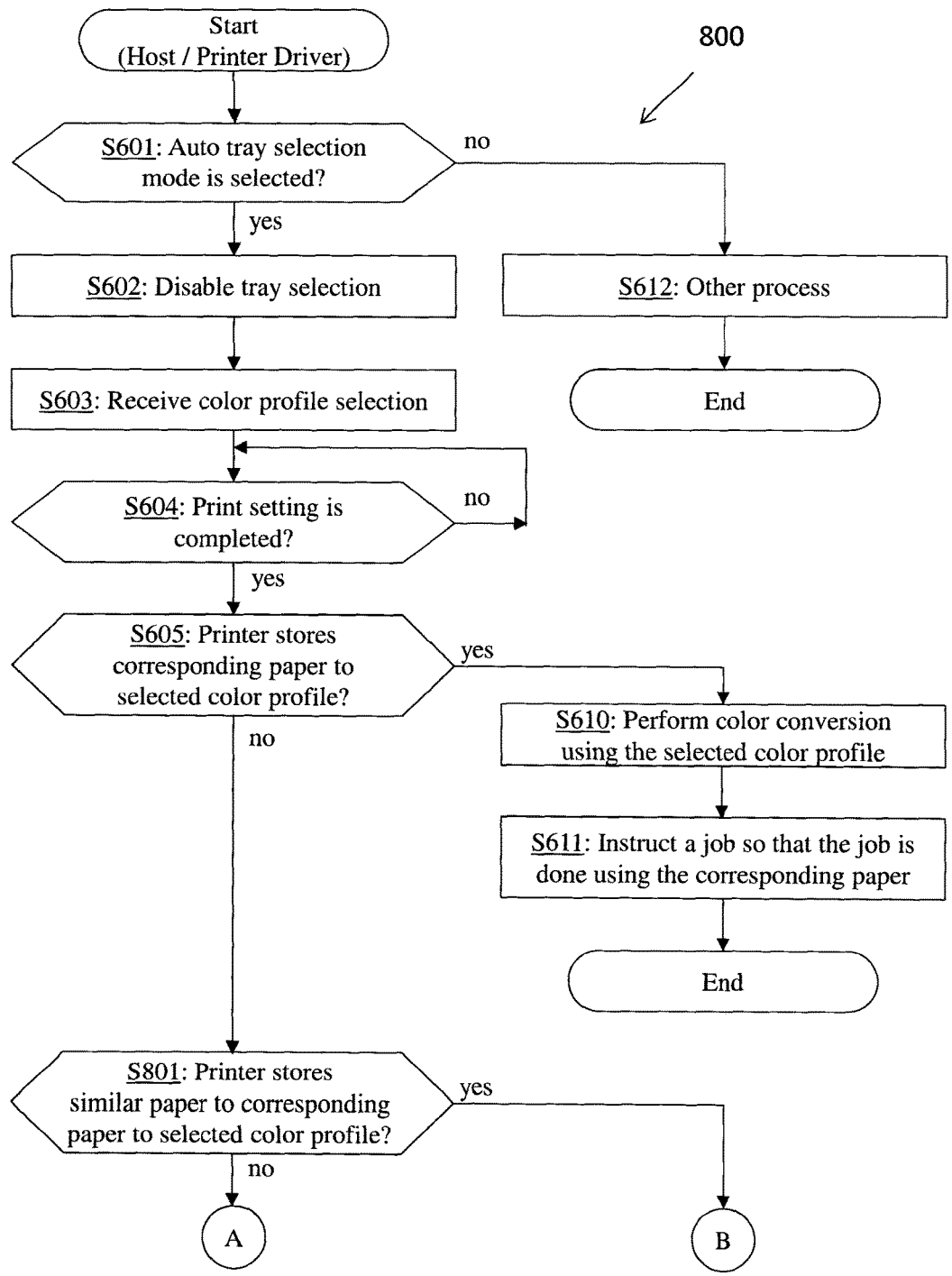
FIG. 8 is a flow chart illustrating a process for producing a color image on print media in accordance with a second exemplary embodiment.
Figure 9:
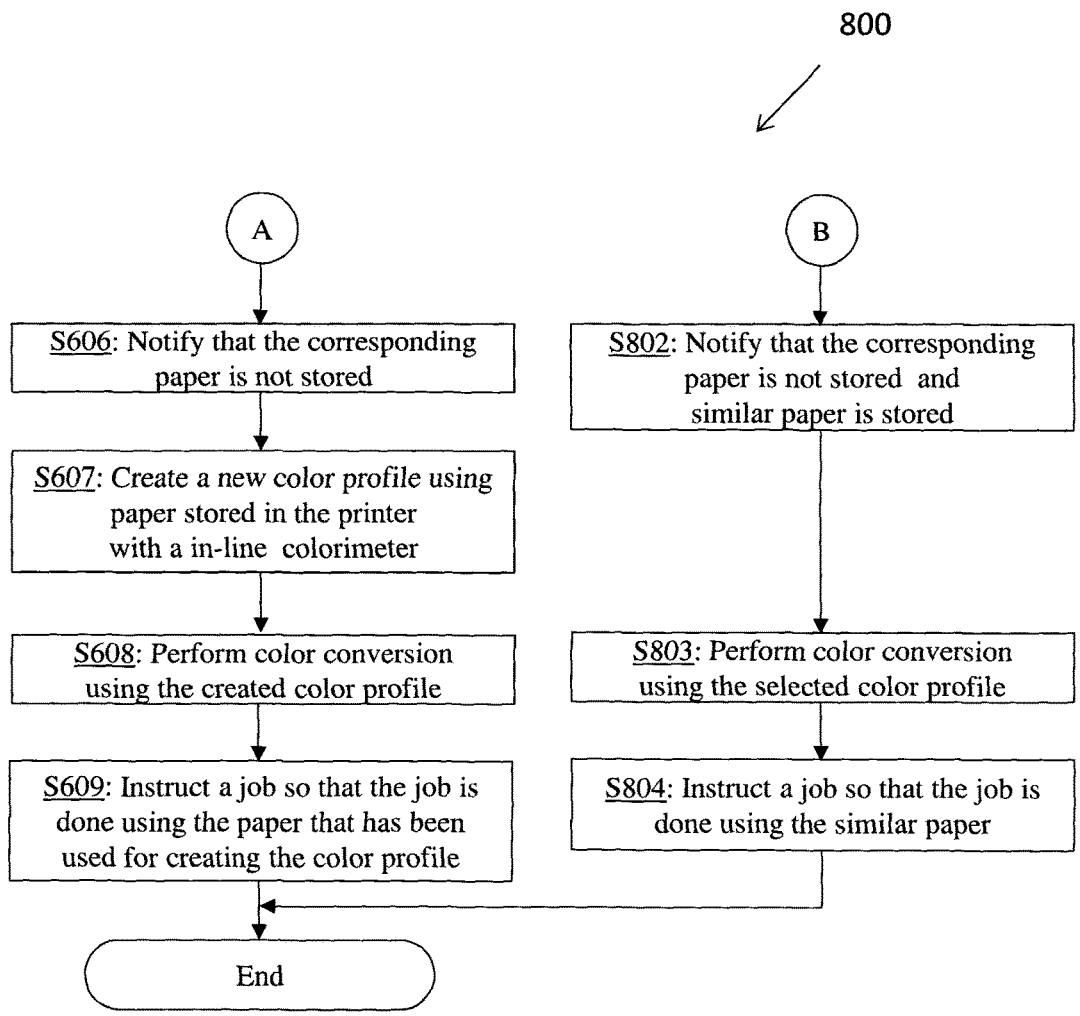
FIG. 9 is a flow chart illustrating a process for producing a color image on print media in accordance with the second exemplary embodiment as shown in FIG. 8.

In accordance with a second exemplary embodiment, even though the print media (or paper) 200 corresponding to the designated color profile is not stored in the printer 20, the system 100 can be configured to decide whether or not a similar print media (or paper) 200 to the print media (or paper) 200 corresponding to the designated color profile is stored in the printer 20. In accordance with an exemplary embodiment, if a similar print media 200 is available, the printing can continue using the similar print media (or paper) 200 (FIGS. 8 and 9, steps S802-S804). When the print media (or paper) 200 corresponding to the designated color profile is not stored in the printer ("No" at S605), the printer 20 can decide whether or not a similar print media to the print media corresponding to the designated color profile is stored in the printer 20.

In accordance with an exemplary embodiment, a similar print media can include all or most of the important attributes of the print media. For example, each of the one or more attributes of the print media stored in the printer 20 can be assigned a value for determining if the print media 200 stored in the printer 20 has print attributes for obtaining the rendering intent of the selected color profile. If the print media 200 has most of the attributes, for example, those attributes having a higher value in the attribute chart or table, the print media within the printer 20 may be considered to be similar (S802). If the similar print media is stored in the printer ("Yes" at S801), the printer will continue printing using the similar print media or paper (FIG. 9, S802-804).

In accordance with an exemplary embodiment, each of the determinations and/or processes (for example, creating a color profile and/or color converting) and displays (notifications) can be done on either the host computer side (printer driver) 10 or the printer side 20, and each of the tables 1000, 1100, 1200 (FIGS. 10-12) can be stored or hosted either on the host computer or client device 10, for example, on the printer driver, or on the printer 20.

Figure 3A:
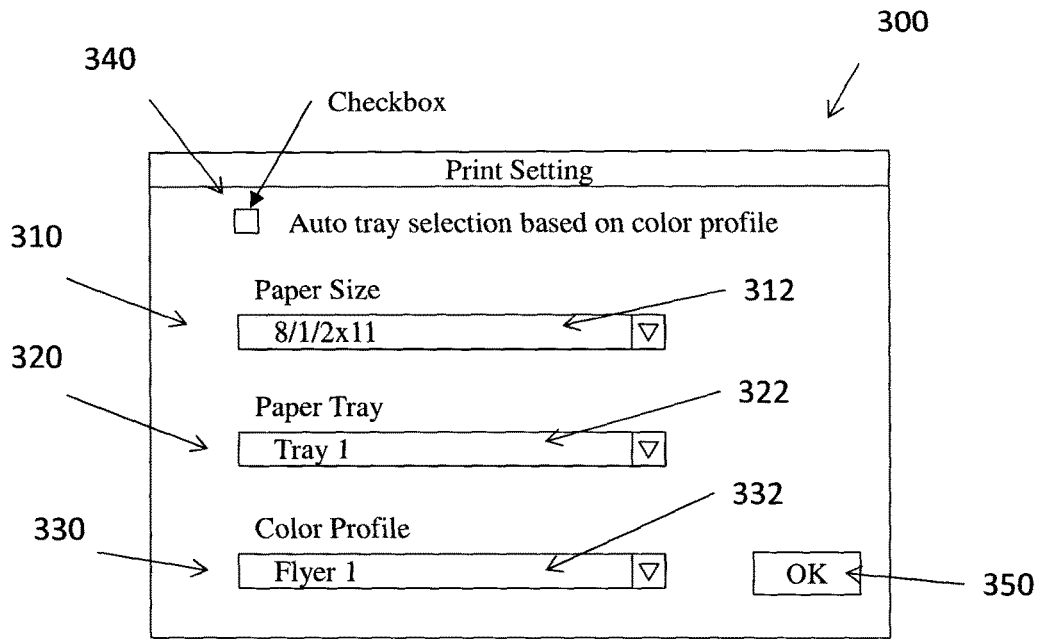
FIG. 3A is an illustration of a printer driver user interface on a display unit or a graphical user interface of an exemplary host computer for use with the system as shown in FIG. 1 in accordance with an exemplary embodiment.

FIG. 3A is an illustration of a printer driver user interface 300 on a display unit (or graphical user interface) 14 of an exemplary client device 10 for use with the system 100 as shown in FIG. 1. In accordance with an exemplary embodiment, the system and method as disclosed herein starts when a user wishes to print a document (FIG. 6). The printer driver on the client device 10 receives a selection from the user on which mode the user wishes to use based on either an auto tray selection mode (checkbox 340), or alternatively, a normal mode. Typically, in the normal mode (when user does not check the auto tray selection based on color checkbox 340, the user selects the designated paper to be used. Alternatively, if the user checks the checkbox 340, and the user can designate a color profile 342 and a paper size 310 on the printer 20 without having to designate a paper tray 322 and/or a paper type on the printer 20 (step S602 in FIG. 6).

As shown in FIG. 3A, the printer driver user interface 300 can have one or more print settings, including, for example, a paper size window 310, a paper tray window 320, and a color profile window 330. The printer driver user interface 300 can also include an auto tray selection based on color profile check box 340, and "OK" tab 350. In accordance with an exemplary embodiment, the "OK" tab 350 is an approval of the selected the paper size 312 in the paper size window 310, the paper tray 322 in the paper tray window 320, the color profile 332 in the color profile window 330, and/or the selection of the auto tray selection based on the color profile check box 340.

In accordance with an exemplary embodiment, the auto tray selection based on color profile box 340 is preferably a check box, which when checked automatically selects the paper tray 28 within the printer 20 as disclosed herein. The paper size window 310, the paper tray window 320, and the color profile window 330 can be pull down windows, which provide a link to one or more papers sizes 312, one or more paper trays 322, and one or more color profiles 332, respectively. The "OK" tab 350 is preferably a click through tab, which after the user either selects the auto tray selection based on the color profile window 330 and/or the paper size window 310, the paper tray window 320, and the color profile window 330, proceeds to print a print job on the printer 20. In accordance with an exemplary embodiment, rather than pull down windows or click through tabs, the windows or tabs 310, 320, 330, 340, 350, can be controlled via a touch screen technology, which can detect the presence and location of a touch within the display area 25 to change the paper size 312, change the paper tray 322, select the color profile 332, select the auto tray selection based on color profile 340, and/or "OK" tab 350.

Figure 3B:
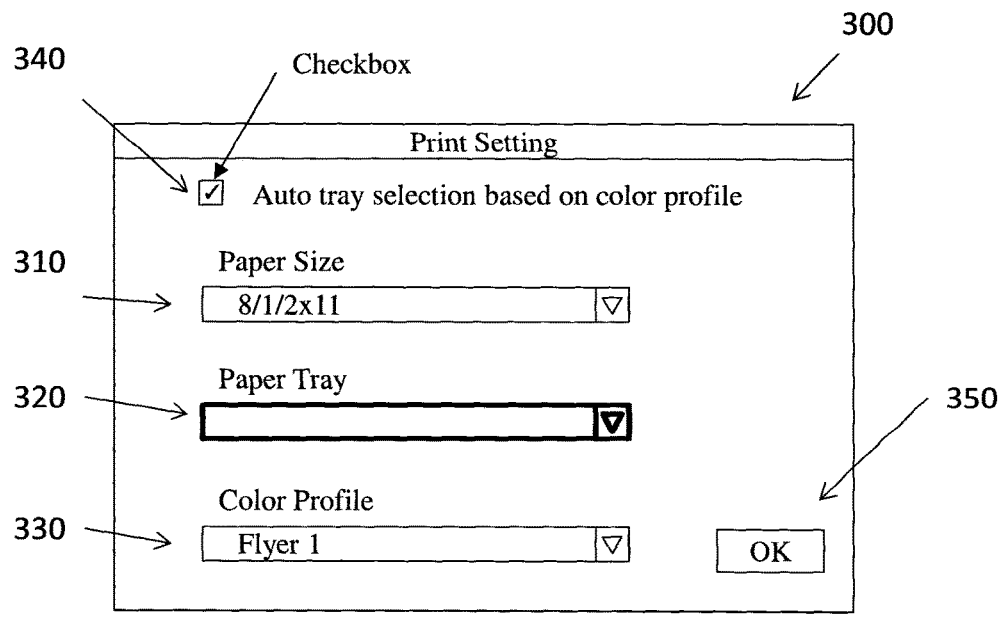
FIG. 3B is an illustration of a printer driver user interface on a display unit or a graphical user interface of an exemplary host computer for use with the system as shown in FIG. 1 in accordance with an exemplary embodiment.

FIG. 3B is an illustration of a driver user interface 300 on the display unit or graphical user interface 14 of an exemplary host computer 10 for use with the system 100 as shown in FIG. 1 in accordance with an exemplary embodiment. In accordance with an exemplary embodiment, for example, the user can designate only a "color profile" 332, for example, "Flyer 1" without designating a paper tray 322 and/or a paper type 312, and then the system 100 automatically determines a paper tray (and paper type) based on the designated color profile 332.

Figure 4:
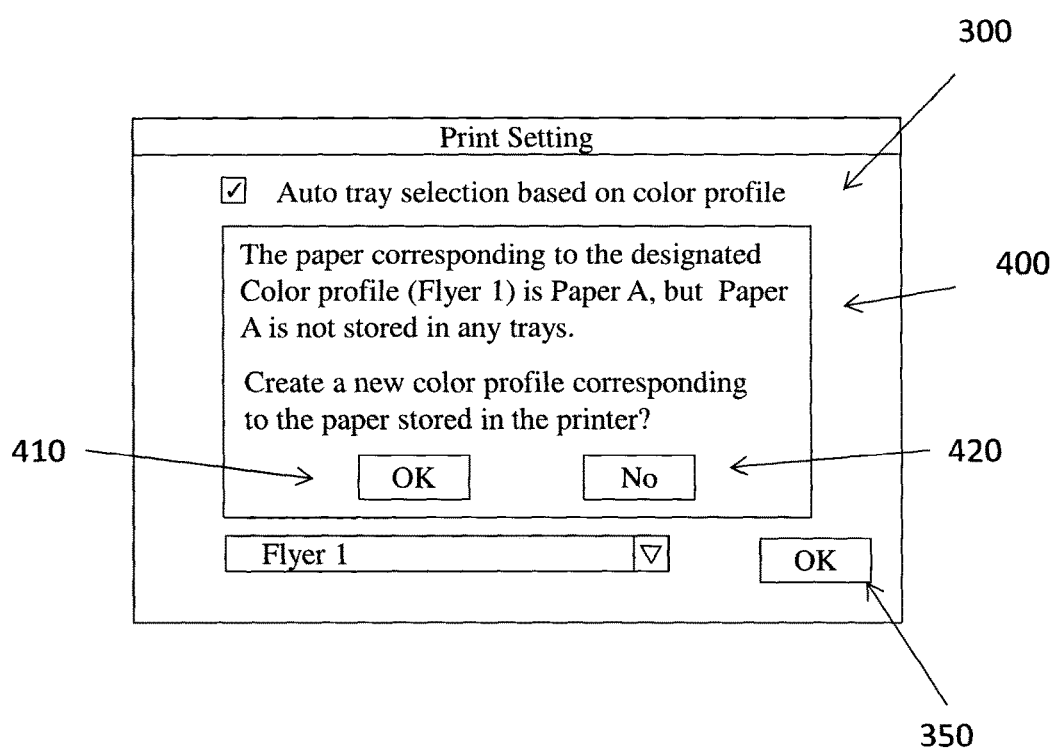
FIG. 4 is an illustration of a printer driver user interface on a display unit or a graphical user interface of an exemplary host computer for use with the system as shown in FIG. 1 in accordance with an exemplary embodiment.

FIG. 4 is an illustration of a printer driver user interface 300 on a display unit or graphical user interface 14 of an exemplary host computer 10 for use with the system as shown in FIG. 1 in accordance with an exemplary embodiment. As shown in FIG. 4, when a color profile is automatically designated by the selection of the check box 340, if the print media (or paper) 200 corresponding to the designated color profile is not stored in the printer 20, the fact is alerted to a user via a pop up box or window 400, which can read, for example, as follows: "The paper corresponding to the designated Color profile (Flyer 1) is Paper A, but Paper A is not stored in any trays". The pop up box or window 400 can also ask if the user would like to create a new color profile, for example, as follows: "Create a new color profile corresponding to the paper stored in the printer?" In accordance with an exemplary embodiment, a pair of check boxes 410 are provided, which indicate "OK" 410 (i.e., Yes), or "No", 420, in response to creating a new color profile for the print media stored in the printer 20.

Figure 5:
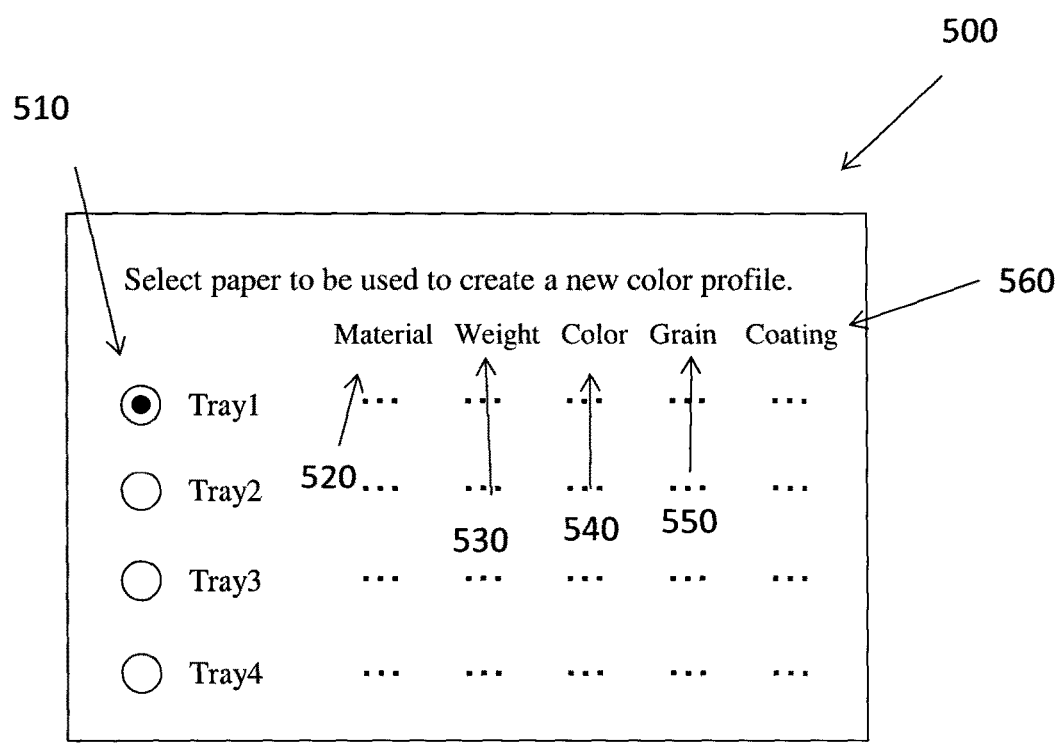
FIG. 5 is an illustration of a printer driver user interface on a display unit or a graphical user interface of an exemplary host computer for use with the system as shown in FIG. 1 in accordance with an exemplary embodiment.

FIG. 5 is an illustration of a printer driver user interface 500 on a graphical user interface 15 of an exemplary host computer 10 for use with the system 100 as shown in FIG. 1 in accordance with an exemplary embodiment. As shown in FIG. 5, if the user selects the "OK" box (i.e., Yes) 410 in FIG. 4, the process ask the user which tray of the printer 20 the user would like to create a new color profile. For example, as shown in FIG. 5, the options can include a Tray selection 510, and information corresponding to the Material 520, Weight 530, Color 540, Grain 550, and Coating 550 of the print media 200 contained within each of the trays (Tray1, Tray2, Tray3, Tray4 . . . TrayN) 510.

FIG. 6 is a flow chart 600 illustrating a process for producing the best color image on print media in accordance with a first exemplary embodiment as executed on the client device 10. As shown in FIG. 6, the process starts on the host computer or client device 10, and in step S601, a determination is made if the auto tray selection mode 340 as shown in FIGS. 3A and 3B has been selected. If the auto tray selection mode 340 has not been checked, the process continues to step S612, where the process continues, for example, to a normal mode, where a user can select the designated paper to be used. Alternatively, if the auto tray selection mode 340 has been selected, the process continues to step S602, where the tray selection is disable. In step S603, the color profile selection 332 is received, and in step S604, a determination can be made if each of the print settings needed to complete the print job have been received. For example, if a specific size paper 312 is needed. If not all the print settings are received the process returns to step S603, for additional information. If all the print settings have been received, the process continues to step S605, wherein a determination is made if the printer has the corresponding paper for the selected color profile.

In accordance with an exemplary embodiment, if the printer 20 does not have a paper tray 322 with the corresponding paper for the selected color profile 332, in step S606, the user can be notified by a pop up box 400 as shown in FIG. 4, that the corresponding paper for the selected color profile is not stored in the printer 20. As set forth in FIG. 4, in step S607, the user can be asked if he or she would like to create, for example, a new color profile using paper stored in the printer with an in-line colorimeter. If the user selects "YES", in step S608 in response to the request to create a new color profile, the host computer in response to user's instruction, color patches are printed and the printed patches are measured by an inline color calibration unit (ICCU) 29, or, for example, an offline colorimeter in order to make new color profile corresponding to the paper stored in the printer. In step S609, the printer 20 is instructed to print the print job using the print media (or paper) 200 in the selected tray 28 that been used to create the new color profile.

In accordance with an exemplary embodiment, if the printer 20 has the print media 200 matching (or corresponding) to the selected color profile 332, the process continues to step S610, where a color conversion is performed using the selected color profile, and in step S611, the printer 20 is instructed to print the print job using the corresponding print media (or paper) 200.

Figure 7:
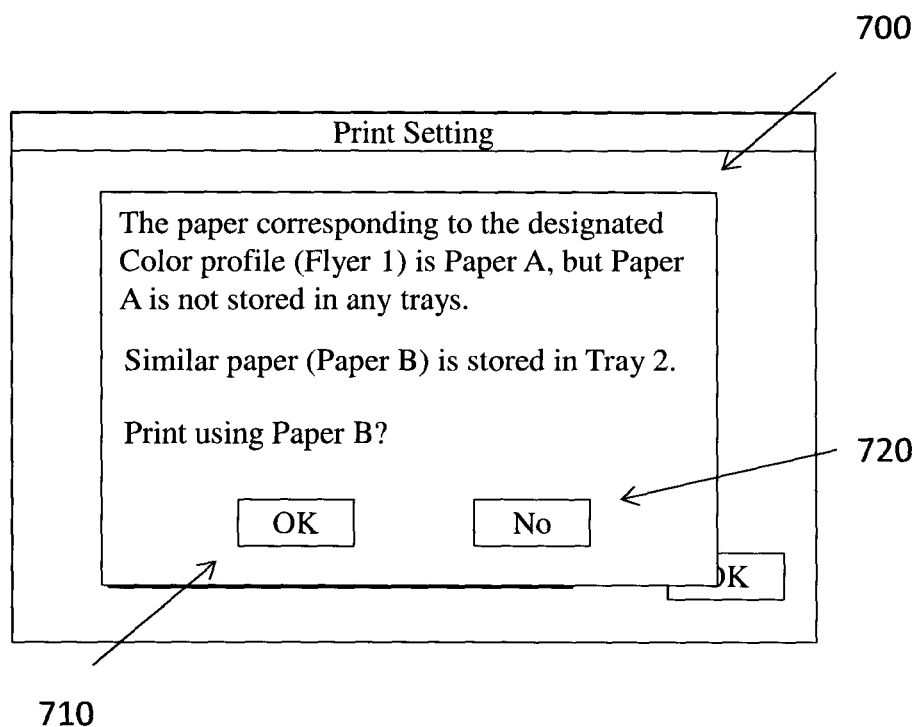
FIG. 7 is an illustration of a printer driver user interface on a display unit of a graphical user interface of an exemplary host computer showing print settings in accordance with an exemplary embodiment.

FIG. 7 is an illustration of a printer driver user interface 700 on a graphical user interface 14 of an exemplary host computer 10 showing print settings in accordance with an exemplary embodiment. As shown in FIG. 7, alternatively, the user can be advised, "The paper corresponding to the designated color profile (Flyer 1) is Paper A, but Paper A is not stored in any trays." However, "Similar paper (Paper B) is stored in Tray 2." The user is then asked, if he or she would like to "Print using Paper B?" The printer driver user interface 700 can include an "OK" tab 710, and a "No" tab 720.

FIGS. 8 and 9 are flow charts 800 illustrating a process for producing the best color image on print media in accordance with a second exemplary embodiment as executed on the client device 10. As shown in FIGS. 8 and 9, the process is similar to the first exemplary embodiment, wherein the process starts in step S601, in which a determination is made if the auto tray selection mode 340 as shown in FIGS. 3A and 3B has been selected. If the auto tray selection mode 340 has not been checked, the process continues to step S612, where the user proceeds, for example, to a normal mode, where a user can select the designated paper to be used. Alternatively, if the auto tray selection mode 340 has been selected, the process continues to step S602, where the tray selection is disabled. In step S603, the color profile selection 332 is received, and in step S604, a determination is made if each of the print settings needed to complete the print job have been received. For example, if a specific size paper 312 is needed. If not all the print settings are received the process returns to step S603, for additional information. If all the print settings have been received, the process continues to step S605, wherein a determination can be made if the selected printer or a printer has the corresponding print media or paper 200 for the selected color profile.

In accordance with an exemplary embodiment, when the print media (or paper) 200 corresponding to the designated color profile is not stored in the printer, in step S801, the client device 10 can decide whether or not similar one to the paper corresponding to the designated color profile is stored in the printer. In accordance with an exemplary embodiment, in step S606, if it is determined that a similar print media 200 is not stored in the printer 20, the user receives the message as set forth in FIG. 4, and wherein in step S607, the user can be asked if he or she would like to create, for example, a new color profile using paper stored in the printer with an in-line colorimeter. In step S608, if the user selects "YES" in response to the request to create a new color profile, the host computer in response to user's instruction, color patches are printed and the printed patches are measured by an inline color calibration unit (ICCU) 28 or, for example, an offline colorimeter in order to make new color profile corresponding to the paper stored in the printer. In step S609, the printer 20 is instructed to print the print job using the print media (or paper) in the selected tray that been used to create the new color profile.

Alternatively, if it is determined that a similar print media 200 is stored in the printer 20, in step S802, the user is advised as set forth in FIG. 7, that "The paper corresponding to the designated color profile (Flyer 1) is Paper A, but Paper A is not stored in any trays." However, "Similar paper (Paper B) is stored in Tray 2." The user is then asked if he or she would like to "Print using Paper B?", and if the user selects the OK tab, the process continues to step S803 where a color conversion using the selected color profile is performed. In step S804, the printer 20 is instructed to print the print job using the selected print media 200 (Paper B), and the print job is printed.

FIG. 10 is an illustration of a profile table 1000 for producing the best color image on print media 200 in accordance with an exemplary embodiment. As shown in FIG. 10, the profile table 1000 can include one or more types of color profiles 332, a rendering intent 1010 for each of the color profiles 332, and desired print media characteristics for each of the profiles. The desired print media characteristics can include, for example, weight 1020, brightness 1030, whiteness 1040, color 1050, coating 1060, grain direction 1070, and texture 1080. The rendering intent 1010 can include, for example, Adobe RGB saturation, Adobe RGB perceptual, Adobe Wide-gamut RGB color space, etc. In accordance with an exemplary embodiment, the profile table 1000 is preferably hosted on the client device 10, however, the profile table 1000 can also be hosted on the printer 20.

FIG. 11 is an illustration of a tray table 1100 for producing the best color image on print media 200 in accordance with an exemplary embodiment. As shown in FIG. 11, the tray table 1100 can include a listing of trays (or print media trays) 1110 in each of the one or more printers or image forming apparatuses 20, each of the one or more trays 1110 having information pertaining to, for example, size 1120, weight 1130, brightness 1140, whiteness 1150, color 1160, coating 1170, grain direction 1180, and texture 1190. In accordance with an exemplary embodiment, the tray table 1100 is preferably hosted on the printer 20 and can be configured to provide attributes of the print media 200 within each of the auto trays 28 to the client device 10.

FIG. 12 is an illustration of a weighted attribute table 1200 for producing the best color image on print media 200 in accordance with an exemplary embodiment. As shown in FIG. 12, the table 1200 can be configured for each of the one or more color profiles 332, and includes a score or weight for calculating a corresponding print media based on a color profile 332. In accordance with an exemplary embodiment, the weighted attribute table 1200 is preferably hosted on the client device 10 and can be used to determine if a similar print media 200 is available as disclosed herein.

Figure 13:
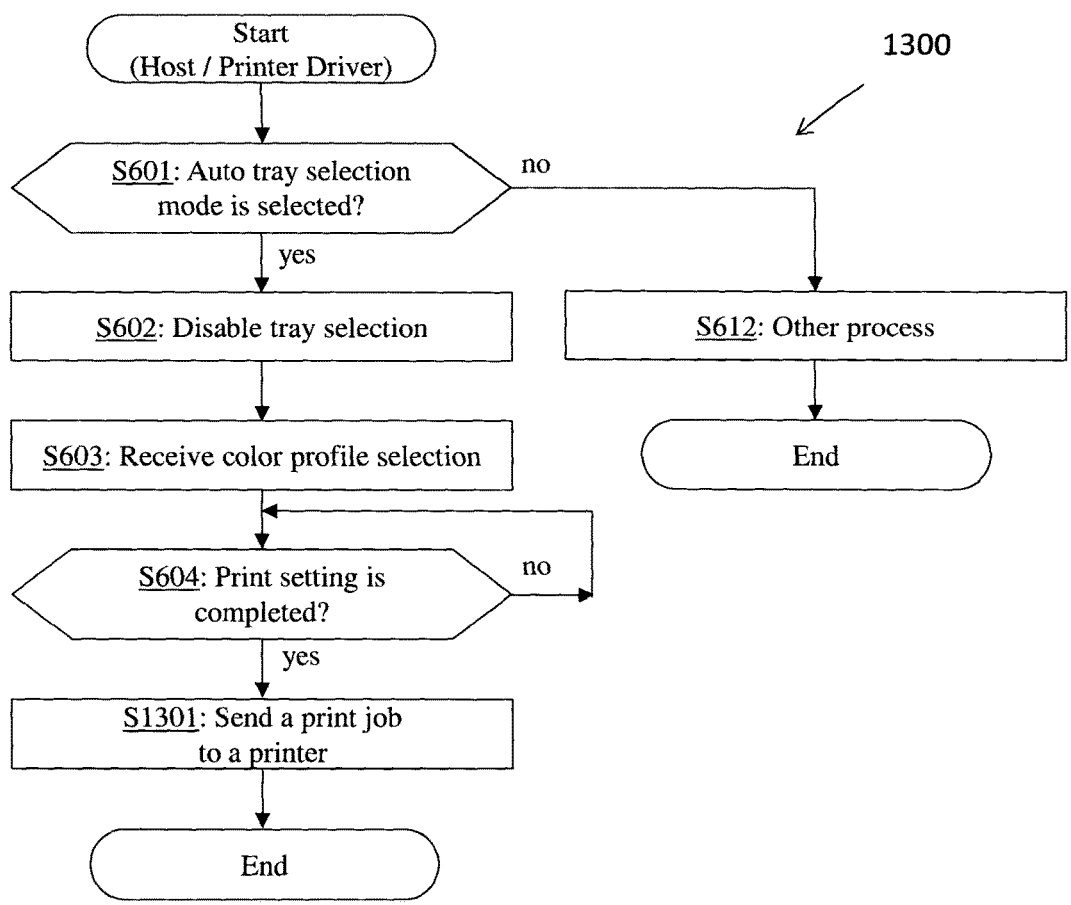
FIG. 13 is a flow chart illustrating a process for producing a color image on print media illustrating the steps performed on a host computer with a printer driver in accordance with an exemplary embodiment.

FIG. 13 is a flow chart 1300 illustrating a process for producing a color image on print media illustrating the steps performed on a host computer 10 with a printer driver in accordance with an exemplary embodiment. As shown in FIG. 13, the process starts on the host computer or client device 10, and in step S601, a determination is made if the auto tray selection mode 340 as shown in FIGS. 3A and 3B has been selected. If the auto tray selection mode 340 has not been checked, the process continues to step S612, where the process continues, for example, to a normal mode, where a user can select the designated paper to be used. Alternatively, if the auto tray selection mode 340 has been selected, the process continues to step S602, where the tray selection is disable. In step S603, the color profile selection 332 is received, and in step S604, a determination can be made if each of the print settings needed to complete the print job have been received. For example, if a specific size paper 312 is needed. If not all the print settings are received the process returns to step S603, for additional information. If all the print settings have been received, the process continues to step S1301, wherein a print job is sent to the printer 20 for printing based on the selected color profile and the corresponding paper for the selected color profile.

Figure 14:
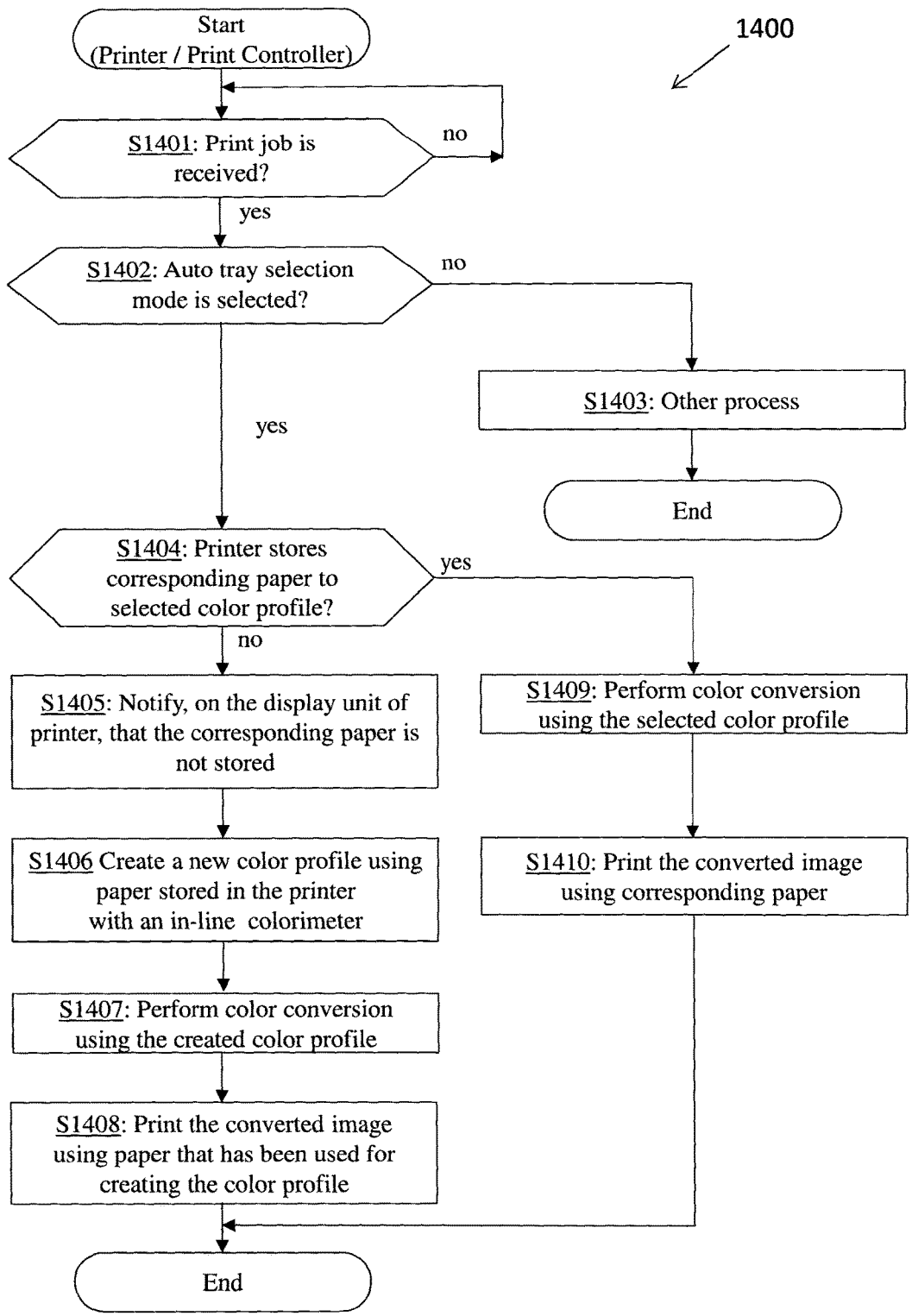
FIG. 14 is a flow chart illustrating a process for producing a color image on print media illustrating the steps performed on a printer with a print controller in accordance with an exemplary embodiment.

FIG. 14 is a flow chart 1400 illustrating a process for producing a color image on print media illustrating the steps performed on a printer 20 with a print controller in accordance with an exemplary embodiment. As shown in FIG. 14, in step S1401, the printer 20 determines if a print job has been received. If no print jobs have been received, the process returns to step S1401. If in step S1401, a print job has been received, the process continues to step S1402, where a determination is made if the auto tray selection mode 340 has been selected for the print job. If the auto tray selection mode 340 has not been checked, the process continues to step S1403, where the process continues, for example, to a normal mode, where a user can select the designated paper to be used.

If the auto tray selection mode 340 has been selected, the process continues to step S1404, where a determination is made, if the printer 20 stores corresponding paper (or print media) 200 for the selected color profile. If the printer in step S1404 does not store the corresponding paper (or print media) 200, the process continues to step S1405, where on the display unit 25 of the printer 20, an operator or user is notified that the corresponding paper (or print media) 200 is not stored in the printer 20. In step S1406, a new color profile using paper (or print media) 200 stored in the printer 20 is then created with an in-line colorimeter 29. In step S1407, a color conversion using the created color profile is performed, and in step S1408, the converted image is printed using paper (or print media) 200 that has been used for creating the color profile.

In step S1404, if the printer 20 does store the corresponding paper (or print media) 200 in a paper tray 28, the process continues to step S1409, where a color conversion is performed using the selected color profile, and step S1410, where the converted image is printed using the corresponding paper (or print media) 200.

Figure 15:
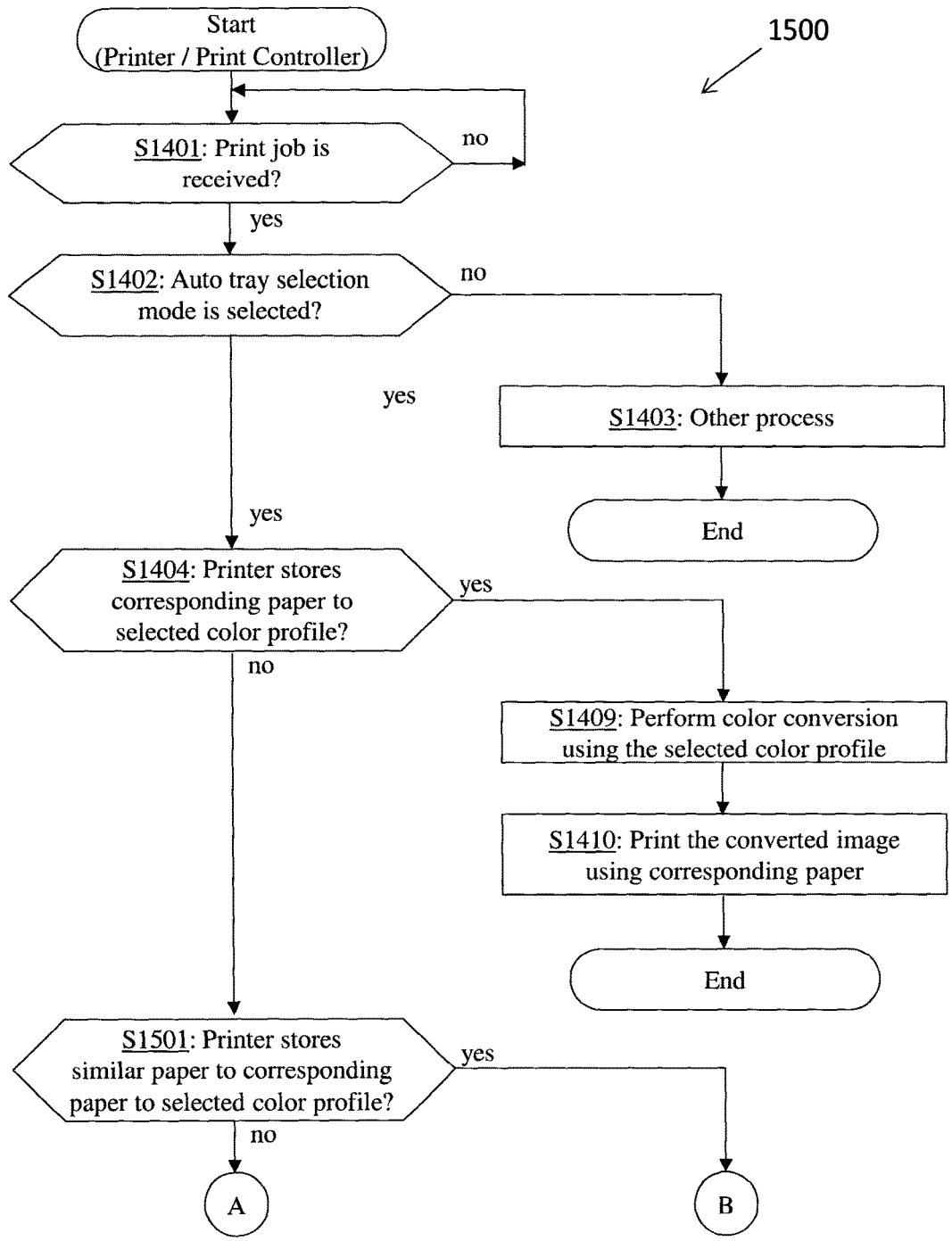
FIG. 15 is a flow chart illustrating a process for producing a color image on print media illustrating the steps performed on a printer with a print controller in accordance with another exemplary embodiment.
Figure 16:
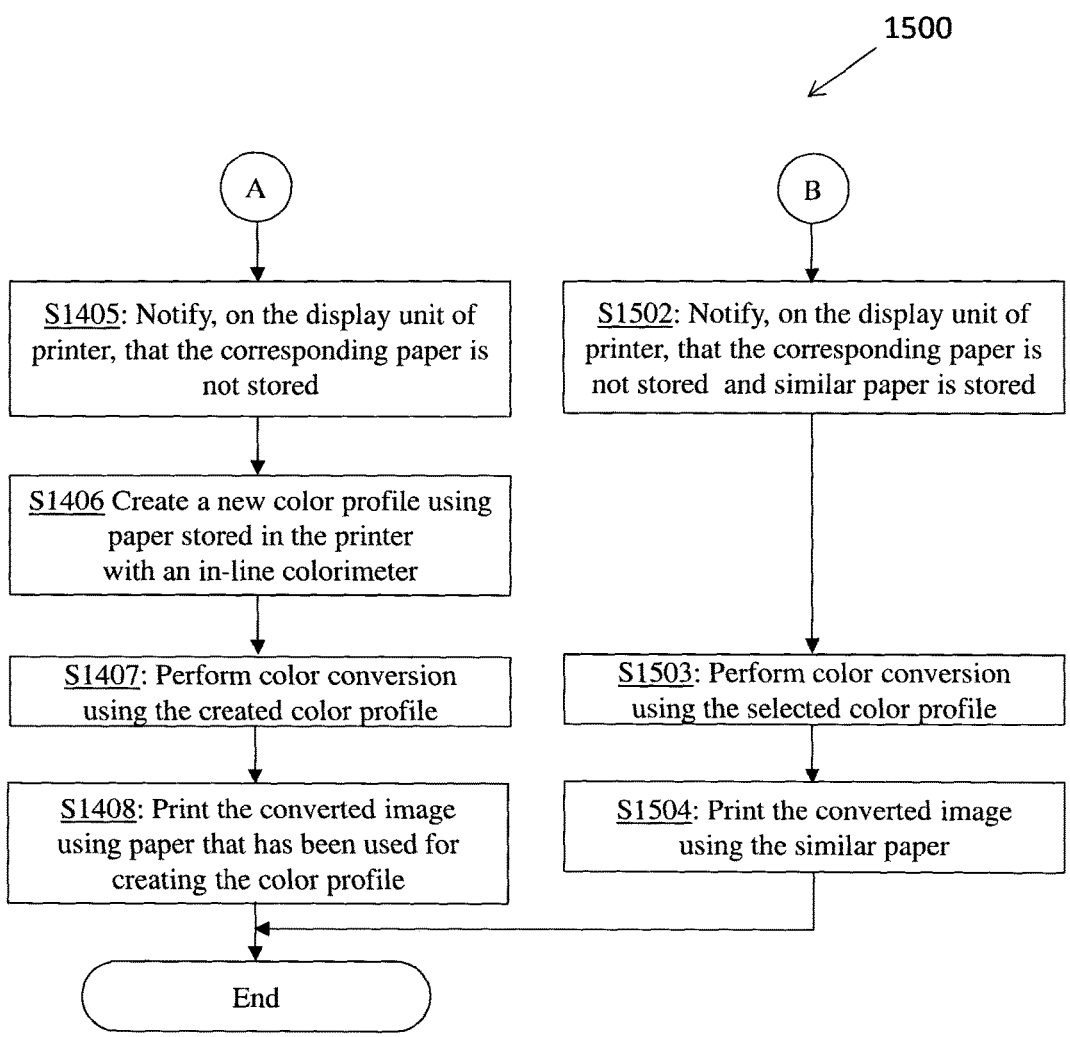
FIG. 16 is a flow chart illustrating a process for producing a color image on print media illustrating the steps performed on the printer with the print controller in accordance with another exemplary embodiment as shown in FIG. 15.

FIGS. 15 and 16 are flow charts 1500 illustrating a process for producing a color image on print media illustrating the steps performed on a printer 20 with a print controller in accordance with another exemplary embodiment. As shown in FIG. 15, in step S1401, the printer 20 determines if a print job has been received. If no print jobs have been received, the process returns to step S1401. If in step S1401, a print job has been received, the process continues to step S1402, where a determination is made if the auto tray selection mode 340 has been selected for the print job. If the auto tray selection mode 340 has not been checked, the process continues to step S1403, where the process continues, for example, to a normal mode, where a user can select the designated paper (or print media) to be used.

If the auto tray selection mode 340 has been selected, the process continues to step S1404, where a determination is made if the printer 20 stores within a paper tray 29 corresponding paper (or print media) 200 for the selected color profile 332. In step S1404, if the printer 20 does stores the corresponding paper (or print media) 200 in the paper tray 29, the process continues to step S1409, where a color conversion is performed using the selected color profile 332, and step S1410, where the converted image is printed using the corresponding paper (or print media) 200.

In step S1404, if the printer 20 does not store the corresponding paper (or print media), the process continues to step S1501, where a determination is made if the printer 20 stores a similar paper (or print media) 200 to the corresponding paper (or print media) 200 for the selected color profile 332. In step S1501, if the printer 20 does not store similar paper (or print media) 200 to the corresponding paper (or print media) 200 for the selected color profile 332, the process continues to step S1405 (FIG. 16), where on the display unit 25 of the printer 20, an operator or user is notified that the corresponding paper (or print media) 200 is not stored in the printer 20. In step S1406, a new color profile using paper (or print media) 200 stored in the printer 20 is then created with an in-line colorimeter 29. In step S1407, a color conversion using the created color profile is performed, and in step S1408, the converted image is printed using paper (or print media) 200 that has been used for creating the color profile.

In step S1501, if the printer 20 does store similar paper (or print media) 200, the process continues to step S1052, where on the display unit 25 of the printer 20, an operator or user is notified that the corresponding paper (or print media) 200 is not stored in the printer 20, however, a similar paper (or print media) 200 is stored (or available). The process continues to step S1503, where a color conversion is performed using the selected color profile 332, and to step S1504, where the converted image is printed using the similar paper (or print media) 200.

Figure 17:
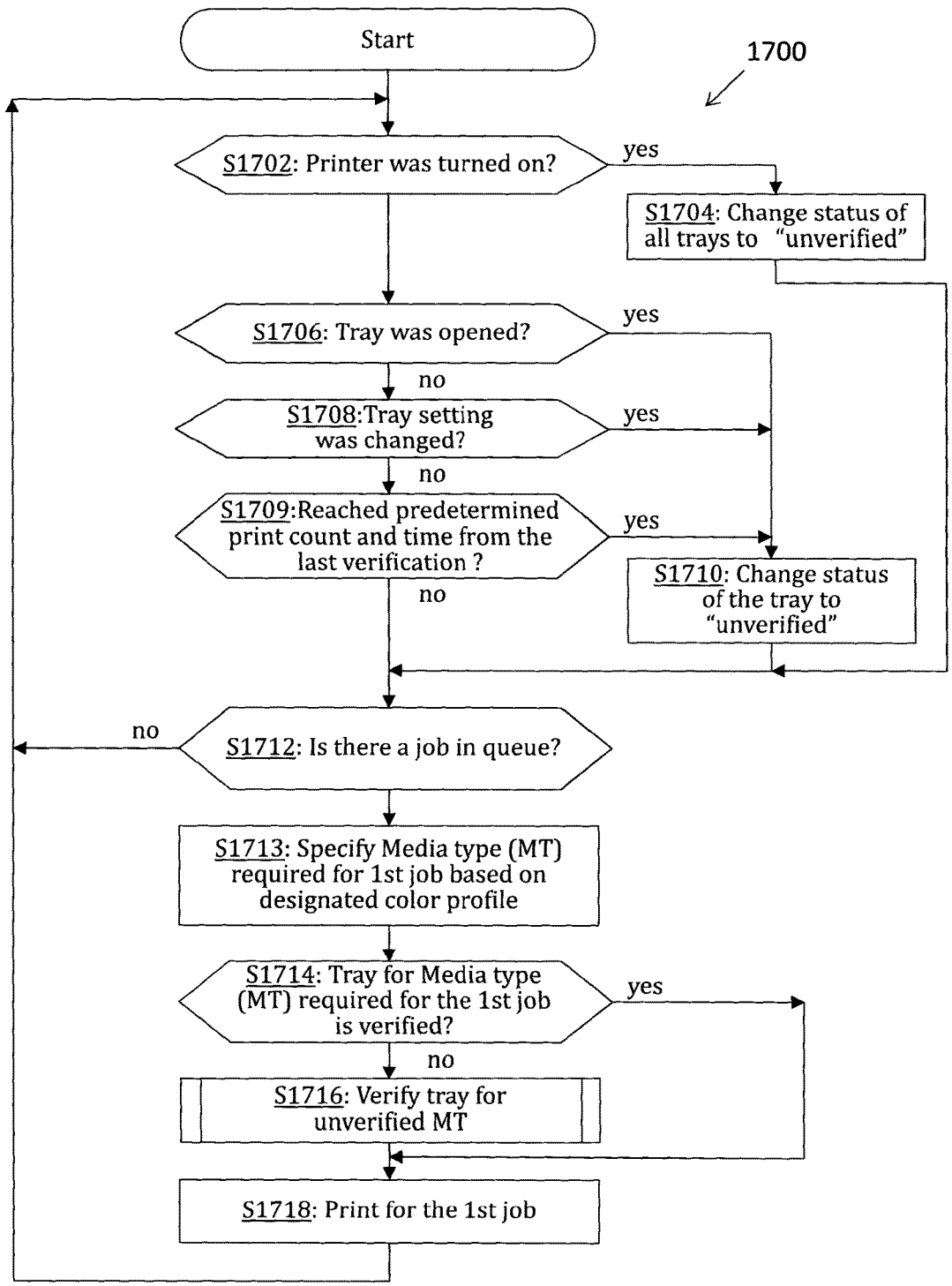
FIG. 17 is a flow chart illustrating a process for verifying a print media within a tray of a printer in accordance with an exemplary embodiment.

FIG. 17 is a flow chart 1700 illustrating a process, which can be conducted by the printer 20, for verifying a print media 200 within a tray (or Feeder Tray) 28 of a printer 20 in accordance with an exemplary embodiment. As shown in FIG. 17, in step S1702, a determination is made if the printer 20 has been turned on or not. In step S1702, if it is determined that the printer 20 was just turned "ON", for example, powered up, the process continues to step S1704, where the status of each (or all) of the trays 28 is changed to "unverified". After step S1704, the process continues to step S1712 for a determination if there is a job, for example, a print job in the queue.

If the printer 20 has previously been turned "ON", i.e., it is determined that the printer 20 was not just turned on, the process continues to step S1706 for a determination, if one or more of the trays 28 has been opened. If one or more of the trays 28 has been opened, the process continues to step S1710, where the status of each of the one or more trays 28, which have been opened is changed to "Unverified". If none of the one or more trays 28 have been opened, the process continues to step S1708, where a determination is made, if a setting on one or more of the trays 28 has been changed, for example, a different type of print media has been identified in the settings on the graphical user interface or display unit 14 of the client device and/or alternatively, the graphical user interface or display unit 25 of the printer 20. If a setting has been changed on one or more of the trays 28, the process continues to step S1710, where the status of the one or more trays 28 in which the tray setting has been changed is changed to "Unverified". If none of the tray settings has been changed, for each of the one or more trays 28, the process continues to step S1709, where an optional determination can be made if a predetermined print count or time from the last verification of the print media 200 within the one or more trays has been reached. If in step S1709, the predetermined print count or time from the last verification has been reached, the process continues to step S1710, where the status of the one or more trays 28 in which the print count or time from last verification has been reached is changed to "unverified".

In accordance with an exemplary embodiment, if in step S1709, the predetermined print count or time from the last verification has not been reached, the process continues to step S1712, where a determination can be made if a job or print job is in the queue. If there is not a job (i.e., a print job) in the queue, the process returns to step S1702. In accordance with an exemplary embodiment, the print count can be a number of sheets of a print media, for example, 500, 1000, 1500, 2000, and more preferable in a print count of a multiple of 500. In addition, the time from the last verification of the print media can be an hour, two hours, or any multiple of hours, for example, and can include time in which the image forming apparatus or printing is executing print jobs, or, for example, time since a print job was last performed.

However, if there is a job in the queue in step S1712, the process continues to step S1713, for determination of a media type (MT) (i.e., required media type) 200 for a $1^{st}$ job in the queue based on designated color profile. In step S1714, a determination is made if the tray for the media type required for the $1^{st}$ job has been verified. In step S1714, if the media type (MT) for the $1^{st}$ job has been verified, the process continues to step S1718 for printing of the $1^{st}$ job.

Figure 18:
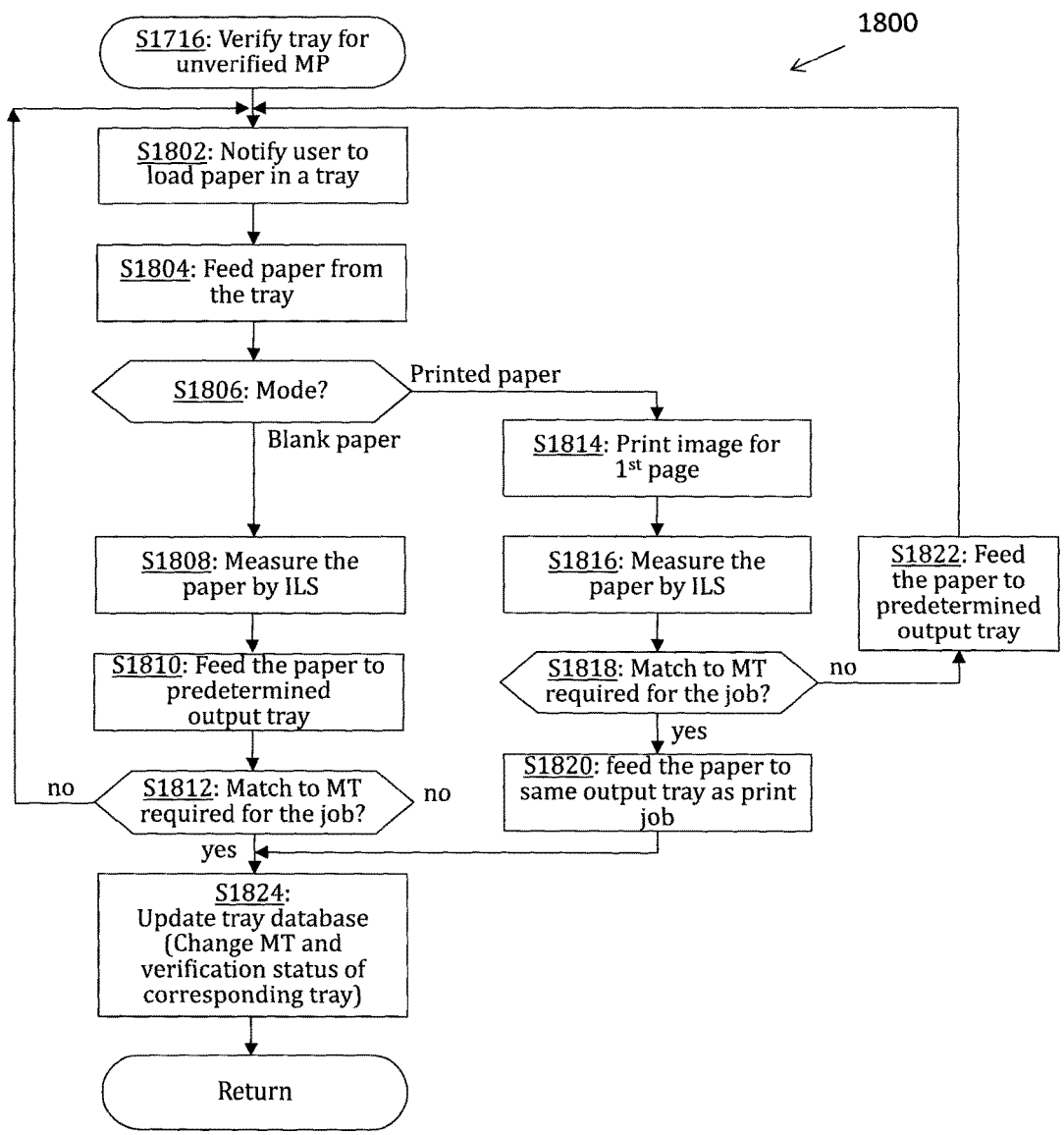
FIG. 18 is a flow chart illustrating a process for verifying a print media within a tray of a printer in accordance with another exemplary embodiment.

In accordance with an exemplary embodiment, if in step S1714, the media type (MT) for the $1^{st}$ job has not been verified, the process continues to step S1716 where the unverified media type (MT) is verified as disclosed herein and shown, for example, in steps S1802-S1824 of FIG. 18.

If the unverified media type (MT) in step S1716 is verified as disclosed herein, the process continues to step S1718 for printing of the 1$^{st}$ job.

FIG. 18 is a flow chart 1800 illustrating a process for verifying a print media 200 within a tray 28 of a printer 20 in accordance with another exemplary embodiment. As set forth above, in step S1716, the printer 20 verifies the media type (MT) within the tray 28 when the tray 28 has not be verified for a specific type of media type (or print media) 200 required by the print job.

As shown in FIG. 18, in step S1802, an operator or user can be notified on either the graphical user interface (GUI) or display unit 14 on an exemplary client device 10 or on the graphical user interface (GUI) or display unit 25 of the printer 20 to load paper in a designated tray 28 of the printer 20. In accordance with an exemplary embodiment, in step S1804, a sheet of print media (or paper) is fed from the paper tray to, for example, an in-line spectrophotometer (ILS) or colorimeter 29 in one of two modes as set forth in step S1806, which can be selected by the user or operator of the printer 20 via the display unit 14 of the client device 10 or the display unit 25 of the printer 20. In accordance with an exemplary embodiment, the two modes as set forth in step S1806 can include a blank paper mode ("Blank Paper") and a printed paper mode ("Printed Paper"). In accordance with an exemplary embodiment, in the blank paper mode, the print media 200 has an absence of toner. Alternatively, in the printed paper mode, toner has been applied or bonded to the print media 200.

In accordance with an exemplary embodiment, in the blank paper mode, the process continues to step S1808, where the print media 200 is measured by an in-line spectrometer (or colorimeter) 29, which is used to measure a print media or media's paper characteristics (or color profile) as set forth herein, for example, brightness, whiteness, and/or color. In step S1810, the measured print media is fed a predetermined output tray. In step S1812, the measured characteristics from step S1808 are compared to the characteristics of the print media or media type required or identified for the print job. If the characteristics of the print media as measured in step S1808 does not match the characteristics of the print media or media type required or identified for the print job, the process returns to step S1802.

Alternatively, if the characteristics of the print media as measured in step S1808 does match the characteristics of the print media or media type required or identified for the print job, the process continues to step S1824, wherein the tray database 2000 (FIG. 20) is updated, for example, the media type and verification status of the corresponding tray 28 is changed, i.e., the media type is verified.

In accordance with an exemplary embodiment, in the printed paper mode, the process continues to step S1814, where an image is printed on the media type (or print media), for example, the first page of the print job. In step S1816, the print media 200 with the printed image is measured by an in-line spectrometer (ILS) or colorimeter 29, which is used to measure a print media or media's paper characteristics as set forth herein, for example, brightness, whiteness, and color. In accordance with an exemplary embodiment, for example, the ILS or colorimeter 29 can read the characteristics in a margin (or unprinted area) of the printed sheet. In step S1818, the measured characteristics from step S1816 are compared to the characteristics of the print media or media type required or identified for the print job. If the characteristics of the print media as measured in step S1818 do not match the characteristics of the print media or media type required or identified for the print job, the process returns to step S1822, where the print media with the printed image is fed to a predetermined output tray and the process returns to step S1802. In accordance with an exemplary embodiment, the predetermined output tray is a tray different than an output tray from which a desired print job is retrieved, such that, the predetermined tray is configured to receive print job, which have been printed on a print media having characteristics different than required or identified in the print job.

Alternatively, in accordance with an exemplary embodiment, if the characteristics of the print media with the printed image as measured in step S1818 do match the characteristics of the print media or media type required or identified for the print job, the process continues to step S1820, the paper is fed to a same output tray as a print job, and the process continues to step S1824, wherein the tray database 2000 (FIG. 20) is updated, for example, the media type and verification status of the corresponding tray 28 is changed, for example, i.e., the status of the tray and corresponding media type is changed to "Verified".

Figure 19:
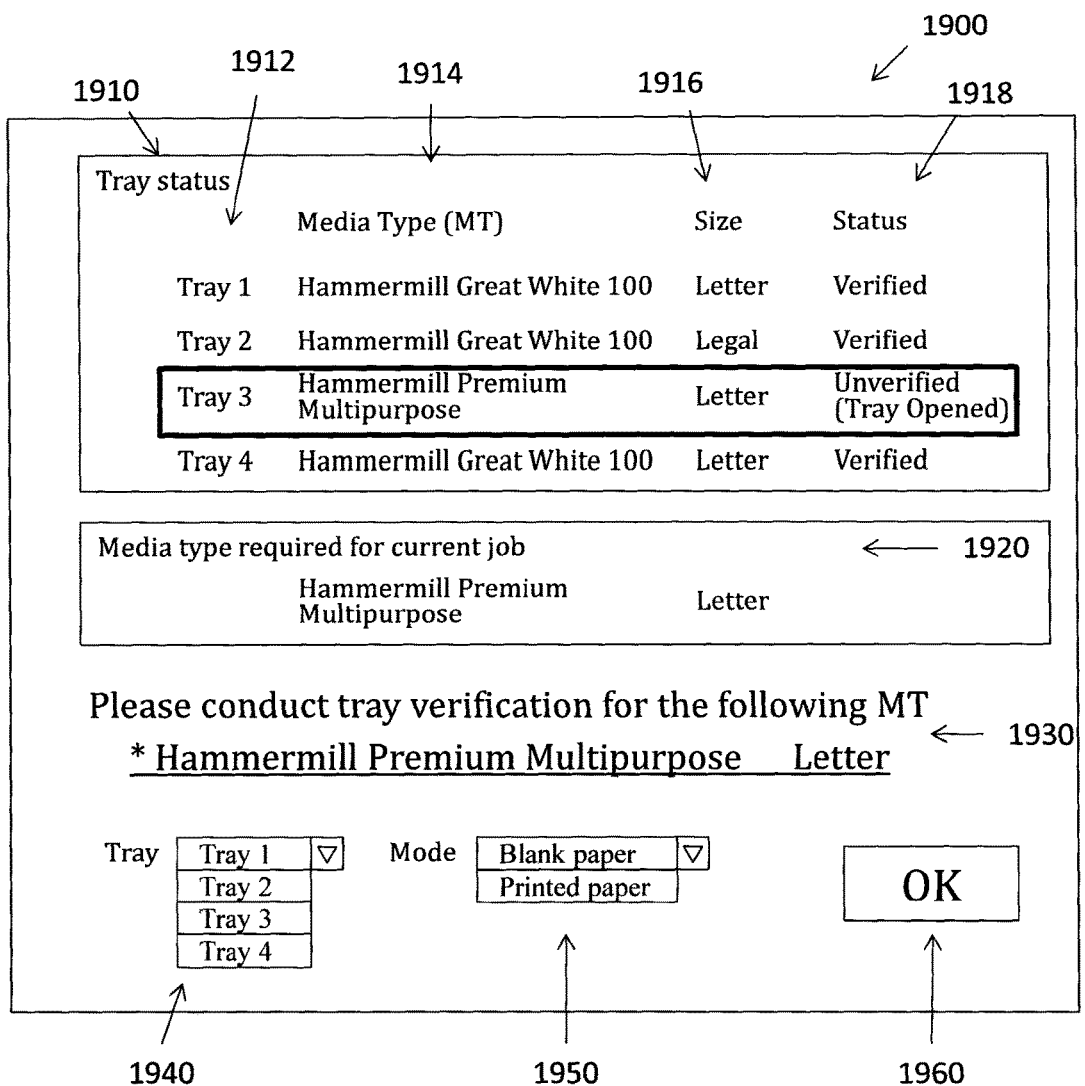
FIG. 19 is an illustration of a graphical user interface or display unit on a printer for verifying a print media within a tray of a printer in accordance with an exemplary embodiment.

FIG. 19 is an illustration of a graphical user interface (GUI) or display unit 14 on an exemplary client device 10 for verifying a print media 200 within a tray 28 of a printer 20 in accordance with an exemplary embodiment. As shown in FIG. 19, the user interface or display unit 14 can be configured to display a tray status 1910, which can include a tray number 1912, a media type (MT) 1914, a paper or print media size 1916, and a status 1918, which can include a reason for each of the statuses, for example, "Verified", "Unverified", or "Unverified (Tray Opened)".

In accordance with an exemplary embodiment, the GUI or display unit 14 can also include a media type required for current job identifier 1920, which can read, for example, "Hammermill Premium Multipurpose" and a size "Letter". In addition, as disclosed, for example, in steps S1802-S1806, the user can be instructed 1930, for example, to "Please conduct tray verification for the following MT * Hammermill Premium Multipurpose Letter" with a pull down menu 1940 with a listing of trays and a mode pull down menu 1950. The graphical user interface of display unit 14 and an "OK" tab or icon for selecting a mode 1950, "Blank Paper" or "Printed Paper" as disclosed herein for each of the one or more trays 1940 of the printer 20.

In accordance with an exemplary embodiment, the system and method as disclosed herein can include a default selection for the pull down menus 1940, 1950 for the "tray" and/or "mode" selection, which selection can be automatically changed based on the relationship of the paper verified the last time and the paper to be verified. In addition, the printer 20 can be configured to automatically (without any user intervention) select the "tray" and/or "mode" based on the relationship of the paper verified the last time and the paper to be verified.

In accordance with an alternative exemplary embodiment, the graphical user interface (GUI) or display unit as shown in FIG. 19 can be graphical user interface on a display unit 25 of the printer 20 as shown in FIG. 1 rather than on the display unit 14 of the exemplary client device 10.

FIG. 20 is an illustration of a database 2000 having a plurality of print media in accordance with an exemplary embodiment. As shown in FIG. 20, the database 2000 can include trays 2010, media type 2020, size 2030, status 2040, for example "Verified" or "Unverified", and an event 2050, which cause the change from verified to unverified, for example, "Tray Open". The media type 2020 can include, for example, "Hammermill Great White 100" and "Hammermill Premium Multipurpose". The size 2030 can include, for example, letter, legal, A3, A4, etc. In accordance with an exemplary embodiment, the tray database 2000 is preferably hosted within the memory 23 of the printer 20, however, it can be hosted on a client device 10, or a remote server (not shown), for example, in a print shop.

FIG. 21 is a chart 2100 illustrating a plurality of types of print media 2110 with corresponding color profile 2120 and media characteristics 2310 in accordance with an exemplary embodiment. As shown in FIG. 21, the types of print media 2110 can include for example, "Hammermill Great White 100", "Hammermill Fore Multipurpose", "Hammermill Premium Multipurpose", "Hammermill Tidal MP", Domtar Copy", "Earthchoice30 Recycled Office Paper", "Century Premium Opaque" and "Cougar". Each of the print media can include a color profile, for example, HamGW100, HamFMP, HamTMP, DomCPY, DomERO, DomCPO, DomCGR, and media characteristics 2130, for example, percentages of certain colors in terms of brightness, whiteness and/or color, which can be expressed in percentage as shown in FIG. 21, for example, % White, % Blue, % Green, % Red, %, Yellow, % Magenta, % Cyan, and % Black.

Figure 22:
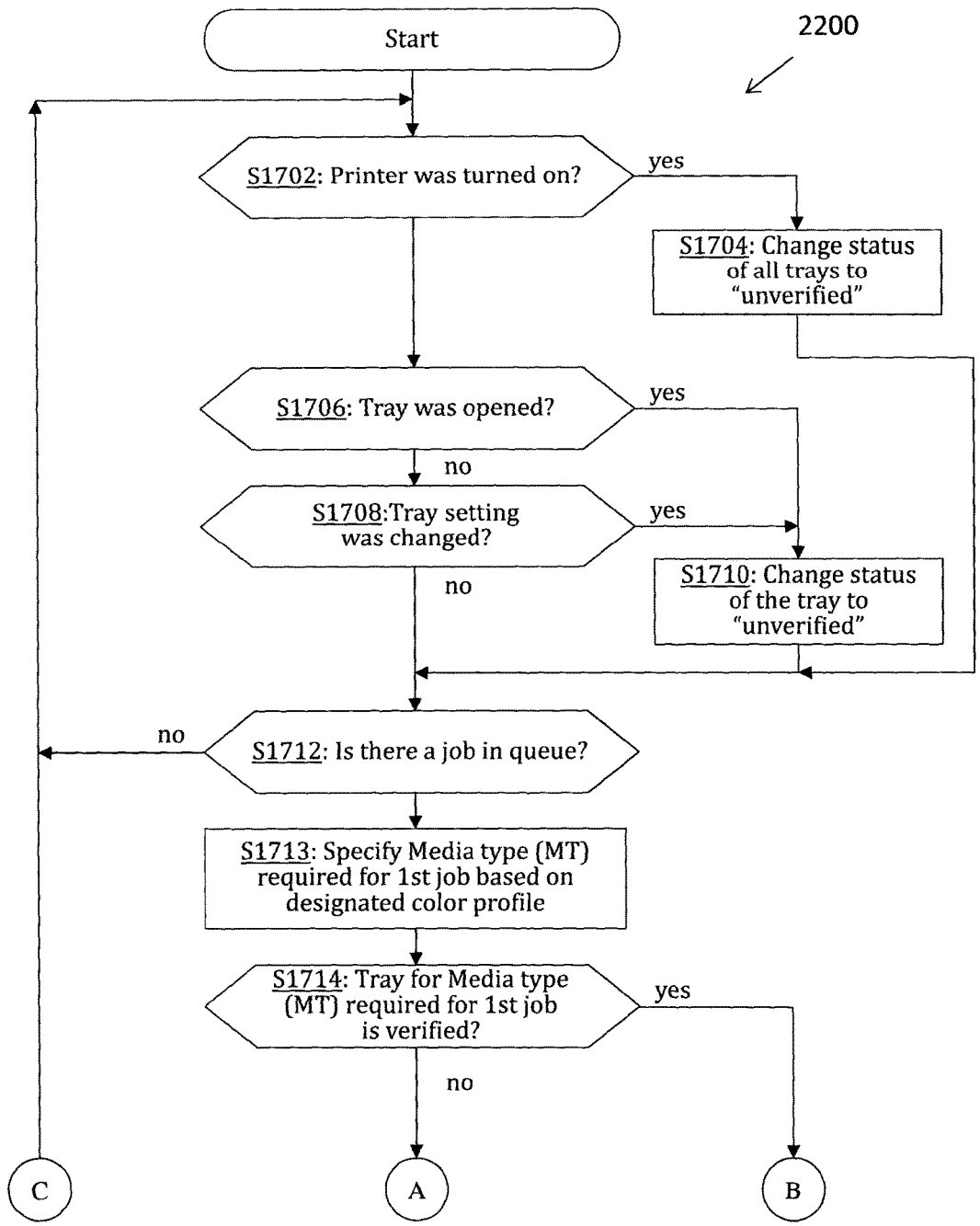
FIGS. 22 and 23 are flow charts illustrating a process for verifying a print media within a tray of a printer in accordance with an exemplary embodiment.
Figure 23:
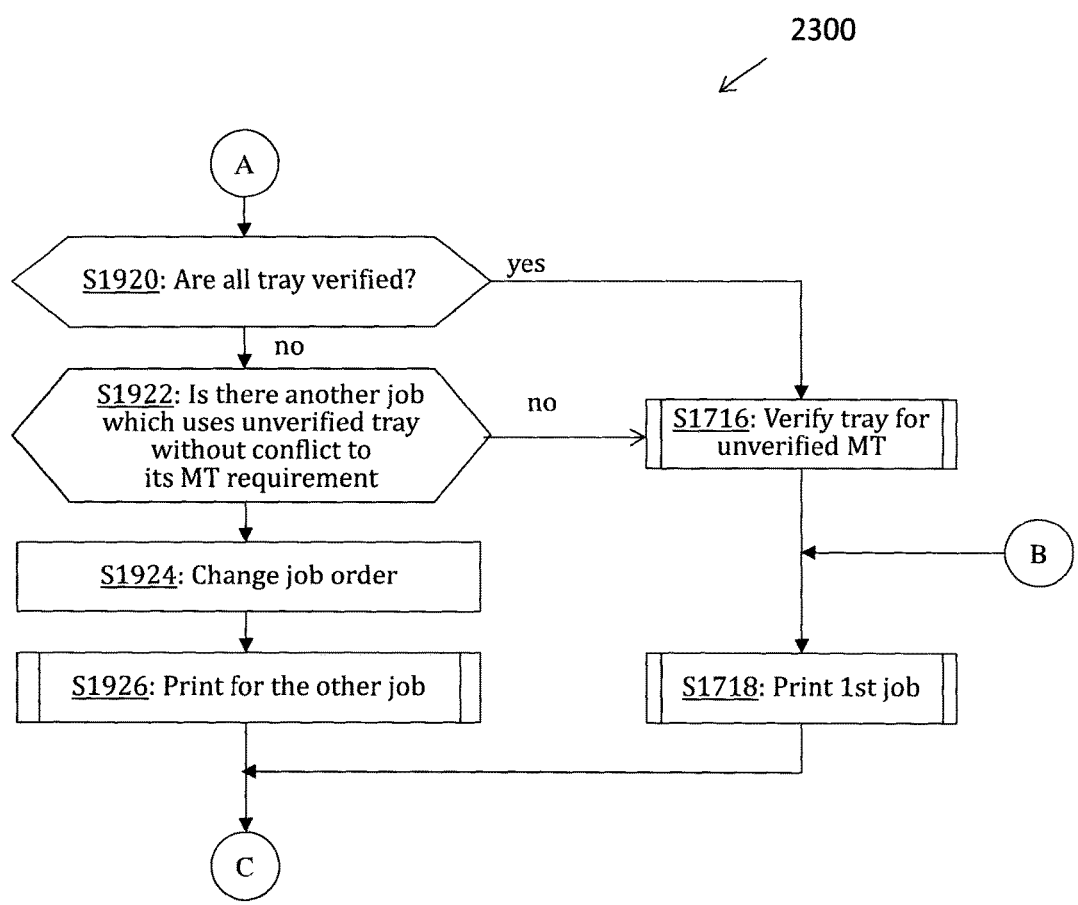

FIGS. 22 and 23 are flow charts 2200, 2300 illustrating a process for verifying a print media 200 within a tray 28 of a printer 20 in accordance with another exemplary embodiment. As shown in FIGS. 22 and 23, in step S1702, a determination is made if the printer 20 has been turned on or not. In step S1702, if it is determined that the printer 20 was just turned "ON", for example, powered up, the process continues to step S1704, where the status of each (or all) of the trays 28 is changed to "unverified". After step S1704, the process continues to step S1712 for a determination if there is a job, for example, a print job in the queue.

If the printer 20 has previously been turned "ON", i.e., it is determined that the printer 20 was not just turned on, the process continues to step S1706 for a determination, if one or more of the trays 28 has been opened. If one or more of the trays 28 has been opened, the process continues to step S1710, where the status of the one or more trays 28, which have been opened is changed to "Unverified". If none of the one or more trays 28 have been opened, the process continues to step S1708, where a determination is made, if a setting on one or more of the trays 28 has been changed, for example, a different type of print media has been identified in the settings on the graphical user interface or display unit 25. If a setting has been changed, the process continues to step S1710, where the status of the one or more trays 28 in which the tray setting has been changed is changed to "unverified". In accordance with an exemplary embodiment, if in step S1708, the tray setting has not been changed, the process continues to step S1712, where a determination can be made if a job or print job is in the queue. If there is not a job (i.e., print job) in the queue, the process returns to step S1702.

However, if there is a job in the queue in step S1712, the process continues to step S1713, for determination of a media type (MT) (i.e., required media type) 200 for a 1$^{st}$ job in the queue based on designated color profile. In step S1714, a determination is made if the tray for the media type required for the 1$^{st}$ job has been verified. In step S1714, if the media type (MT) for the 1$^{st}$ job has been verified, the process continues to step S1718 for printing of the 1$^{st}$ job.

In accordance with an exemplary embodiment, if in step S1714, the media type (MT) for the 1$^{st}$ job has not been verified, the process continues to step S1920, where a determination can be made if each (or all) of the trays 28 within the printer 20 have been verified. If each (or all) of the trays 28 of the printer 20 have been verified, the process continues to step S1716, where the unverified media type (MT) is verified as disclosed herein and shown in steps S1802-S1824 of FIG. 18. If the unverified media type (MT) in step S1716 is verified, the process continues to step S1718 for printing of the 1$^{st}$ job.

In step S1920, if each (or all) of the trays 28 has not been verified, the process continues to step S1922, where a determination is made if there is another job which can use an unverified tray without conflict to the media type (MT) criteria or requirement. In step S1922, if there are no jobs that can use an unverified tray without conflict, the process continues to step S1716. However, in accordance with an exemplary embodiment, if there is another job that can be printed without conflict to the media type in step S1922, the process continues to step S1924 where the job order is changed and in step S1926, the job that can be printed without conflict to the media type is printed. In accordance with an exemplary embodiment, once the print job is printed in step S1926 or the first job is printed in step S1718, the process returns to step S1702.

Figure 24:
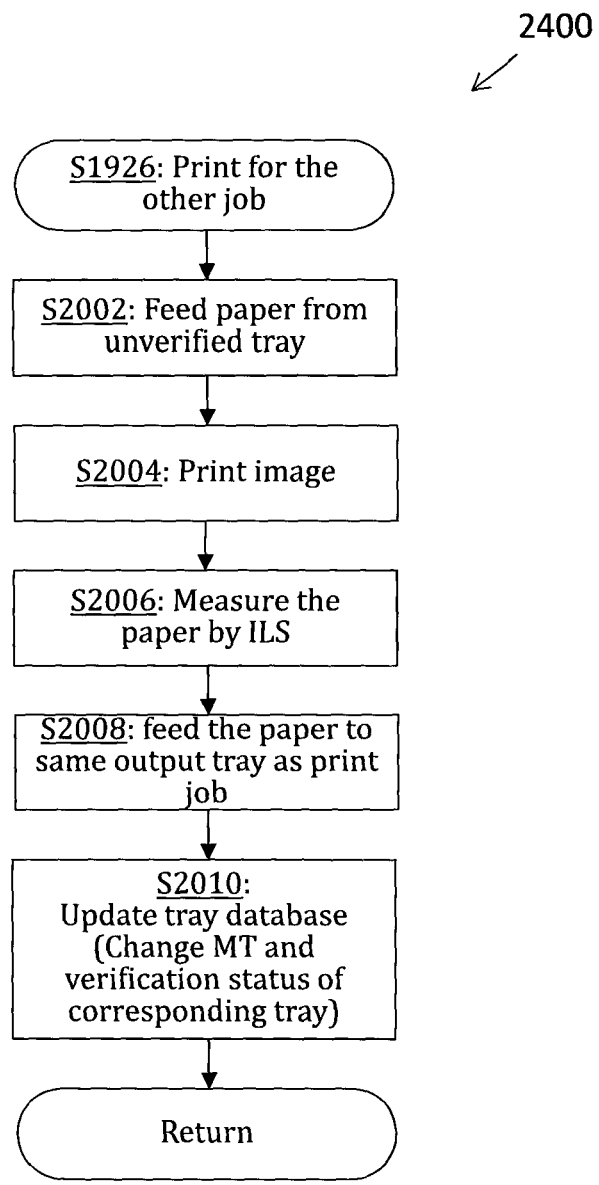
FIG. 24 is a flow chart illustrating a process for verifying a print media within a tray of a printer in accordance with an exemplary embodiment.

FIG. 24 is a flow chart 2400 illustrating a process for verifying a print media 200 within a tray 28 of a printer 20 in accordance with an exemplary embodiment. As shown in FIG. 24, in step S1926, the job without conflict to the type or characteristics of the print media or media type (MT) 200 is printed. In step S2002, the print media (or paper) from the unverified tray is fed into the print engine. In step S2004, an image is printed on the print media (or paper) and in step S2006, the print media 200 with the printed image is measured by an in-line spectrometer (ILS) or colorimeter 29, which is used to measure a print media or media's paper characteristics as set forth herein, for example, brightness, whiteness, and color. In step S2008, the print media with the image is fed to same output tray as the print In step S2010, the tray database 2000 (FIG. 20) is updated with the media type and the verification status is changed to verified.

In accordance with an exemplary embodiment, a non-transitory computer readable recording medium stored with a computer readable program code for producing a color image on a print media is disclosed, the computer readable program code configured to execute a process comprising: receiving a selection of a color profile for a print job on a user interface, the color profile being associated with an attribute of a print media; determining if a tray on a printer stores a first print media corresponding to the selected color profile based on the attribute associated with the selected color profile; and when the tray on the printer stores the first print media corresponding to the selected color profile, instructing a printer to print the print job with the first print media corresponding to the selected color profile from the tray by a print engine on the printer.

In accordance with an exemplary embodiment, a non-transitory computer readable recording medium stored with a computer readable program code is disclosed for verifying a type of print media within trays of an image forming apparatus, the computer readable program code configured to execute a process comprising: feeding a sheet of a print media from a tray of the image forming apparatus to an in-line spectrophotometer; measuring characteristics of the print media with the in-line spectrophotometer, the measured characteristics of the print media including at least one of brightness, whiteness, or color; and determining if the measured characteristics of the print media matches a type of print media identified in a tray database for the tray of the image forming apparatus.

The non-transitory computer readable medium may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of verifying a type of print media within trays of an image forming apparatus, the method comprising:
    feeding a sheet of a print media from a tray of the image forming apparatus to an in-line spectrophotometer;
    measuring characteristics of the print media with the in-line spectrophotometer, the measured characteristics of the print media including at least one of brightness, whiteness, or color;
    determining if the measured characteristics of the print media matches a type of print media identified in a tray database for the tray of the image forming apparatus; and
    printing a print job on the sheet of the print media from the tray of the image forming apparatus only after the print media has been verified in the tray of image forming apparatus.

2. The method of claim 1, further comprising:
    printing an image on the sheet of the print media before measuring the characteristics of the print media; and
    measuring the characteristics of the print media in a margin of the print media, and wherein the margin has not been imaged.

3. The method of claim 2, further comprising:
    discarding the sheet of the print media with the image in a separate tray from a print job when the characteristic of the print media does not match the type of print media identified in the tray database; and
    feeding the sheet of the print media with the image to an output tray for print jobs when the characteristic of the print media does match the type of print media identified in the tray database.

4. The method of claim 1, further comprising:
    updating the tray database upon determining the type of print media identified in the tray of the image forming apparatus.

5. The method of claim 1, further comprising:
    printing a first page of a print job without a specified color profile and/or media type on the sheet of print media when the print media in the tray of the image forming apparatus has not been verified; and
    identifying the type of the print media within the tray of the image forming apparatus from the first page of the print job without the specified color profile and/or media type.

6. The method of claim 5, further comprising:
    changing a job order in a print queue to print the first page of the print job without the specified color profile and/or media type before a print job with a specified color profile and/or media type.

7. The method of claim 1, further comprising:
    changing a status of the print media in the tray database for the tray of the image forming apparatus upon opening the tray, starting the image forming apparatus, and after changing a tray setting, the tray setting relating to a type of print media within the tray of the image forming apparatus.

8. The method of claim 1, further comprising:
    changing a status of the print media in the tray database for the tray of the image forming apparatus after a predetermined print count or a time from a last verification of the type of print media in the tray of the image forming apparatus.

9. The method of claim 1, further comprising:
    receiving the print job on the image forming apparatus, the print job having a color profile, the color profile being associated with an attribute of a print media; and
    printing the print job only when the tray within the image forming apparatus has the print media with the color profile.

10. A non-transitory computer readable recording medium stored with a computer readable program code for verifying a type of print media within trays of an image forming apparatus, the computer readable program code configured to execute a process comprising:
    feeding a sheet of a print media from a tray of the image forming apparatus to an in-line spectrophotometer;
    measuring characteristics of the print media with the in-line spectrophotometer, the measured characteristics of the print media including at least one of brightness, whiteness, or color;
    determining if the measured characteristics of the print media matches a type of print media identified in a tray database for the tray of the image forming apparatus; and
    printing a print job on the sheet of the print media from the tray of the image forming apparatus only after the print media has been verified in the tray of image forming apparatus.

11. The computer readable recoding medium of claim 10, further comprising:
    printing an image on the sheet of the print media before measuring the characteristics of the print media; and
    measuring the characteristics of the print media in a margin of the print media, and wherein the margin has not been imaged.

12. The computer readable recoding medium of claim 11, further comprising:
    discarding the sheet of the print media with the image in a separate tray from a print job when the characteristic of the print media does not match the type of print media identified in the tray database; and
    feeding the sheet of the print media with the image to an output tray for print jobs when the characteristic of the print media does match the type of print media identified in the tray database.

13. The computer readable recoding medium of claim 10, further comprising:
    printing a first page of a print job without a specified color profile and/or media type on the sheet of print media when the print media in the tray of the image forming apparatus has not been verified; and identifying the type of the print media within the tray of the image forming apparatus from the first page of the print job without the specified color profile and/or media type.

14. The computer readable recoding medium of claim 13, further comprising:
changing a job order in a print queue to print the first page of the print job without the specified color profile and/or media type before a print job with a specified color profile and/or media type.

15. The computer readable recoding medium of claim 10, further comprising:
changing a status of the print media in the tray database for the tray of the image forming apparatus upon opening the tray, starting the image forming apparatus, and after changing a tray setting, the tray setting relating to a type of print media within the tray of the image forming apparatus.

16. The computer readable recoding medium of claim 10, further comprising:
changing a status of the print media in the tray database for the tray of the image forming apparatus after a predetermined print count or a time from a last verification of the type of print media in the tray of the image forming apparatus.

17. The computer readable recoding medium of claim 10, further comprising:
receiving the print job on the image forming apparatus, the print job having a color profile, the color profile being associated with an attribute of a print media; and
printing the print job only when the tray within the image forming apparatus has the print media with the color profile.

18. An image forming apparatus, comprising:
an in-line spectrophotometer;
at least one tray configured to hold a print media; and
a processor configured to verifying a type of print media within the at least one tray of the image forming apparatus by executed a process comprising:
feeding a sheet of a print media from the at least one tray of the image forming apparatus to the in-line spectrophotometer;
measuring characteristics of the print media with the in-line spectrophotometer, the measured characteristics of the print media including at least one of brightness, whiteness, or color;
determining if the measured characteristics of the print media matches a type of print media identified in a tray database for the at least one tray of the image forming apparatus; and
printing a print job on the sheet of the print media from the tray of the image forming apparatus only after the print media has been verified in the tray of image forming apparatus.

19. The image forming apparatus of claim 18, further comprising:
a print engine; and
wherein the processor is configured to execute a process comprising:
printing an image on the sheet of the print media before measuring the characteristics of the print media;
measuring the characteristics of the print media in a margin of the print media, and wherein the margin has not been imaged;
discarding the sheet of the print media with the image in a separate tray from a print job when the characteristic of the print media does not match the type of print media identified in the tray database; and
feeding the sheet of the print media with the image to an output tray for print jobs when the characteristic of the print media does match the type of print media identified in the tray database.

20. The image forming apparatus of claim 18, wherein the processor is configured to execute a process comprising:
printing a first page of a print job without a specified color profile and/or media type on the sheet of print media when the print media in the tray of the image forming apparatus has not been verified; and
identifying the type of the print media within the tray of the image forming apparatus from the first page of the print job without the specified color profile and/or media type.

* * * * *